Jan. 26, 1943.     L. B. MILLER ET AL     2,309,411
AIR CONDITIONING CONTROL SYSTEM
Filed Aug. 23, 1935     3 Sheets-Sheet 1

Inventors
Leo B. Miller
Henry F. Dever
By George H Fisher
Attorney

Patented Jan. 26, 1943

2,309,411

UNITED STATES PATENT OFFICE 2,309,411

AIR CONDITIONING CONTROL SYSTEM

Leo B. Miller, Bronxville, N. Y., and Henry F. Dever, Minneapolis, Minn., assignors to Minneapolis-Honeywell Regulator Company, Minneapolis, Minn., a corporation of Delaware Application August 23, 1935, Serial No. 37,606

35 Claims. (Cl. 257—3)

The present invention relates to an improved control system for conditioning the air in a space during all types of weather.

One of the objects is the provision of an improved control system for controlling the cooling, dehumidification, heating, humidifying, supplying of fresh air, and all other phases of a complete all-year air conditioning system.

More specifically, an object of the present invention is the provision of an improved control system for conditioning air in the summer by which the air in a space is maintained at a substantially constant effective temperature. In addition, it is a further object of the invention to vary the effective temperature of the air in the space upon fluctuations in a condition of the outdoor atmosphere and in such manner that the effective temperature in the space is increased as the outdoor temperature rises above some predetermined value. Any desired type of differential may be maintained between the indoor effective temperature and the outdoor condition, which may be outdoor dry bulb temperature, but preferably the arrangement is such that a variable differential is maintained between these conditions.

Another object of the invention is the provision of a summer air conditioning system wherein the effective temperature in the space is maintained substantially constant or is varied within a predetermined range upon variations in an outdoor condition, the arrangement being such that this substantially constant effective temperature or the effective temperature range maintained upon variations in the outdoor conditions is obtained by allowing the relative humidity in the space to fluctuate at will and by increasing or decreasing the space dry bulb temperature in accordance with such fluctuations of the relative humidity so as to obtain the desired effective temperature and super-imposing upon this control a limiting means to prevent the relative humidity from rising to an excessive undesirable value.

A further object of the invention is the adding of heat to the air in the space in the event the removal of moisture therefrom by a cooling process when the relative humidity becomes excessive causes the temperature of the air to become too low. This control is preferably by the temperature of the air being discharged into the space rather than by the temperature of the air in the space after the conditioned air has diffused therein.

Another object of the invention is the provision of summer air conditioning systems of the class set out above in which the amount of fresh air supplied to the space is also controlled. The fresh air supply is preferably controlled in a manner such that it is decreased as the outdoor temperature rises above or falls below some optimum value.

Another object of the invention is the provision of a heating system wherein the effective temperature of a space is maintained substantially constant by controlling the humidity and dry bulb temperature thereof to maintain desired values or ranges of relative humidity and dry bulb temperature, the value or range of the relative humidity maintained being lowered as the outdoor temperature lowers whereby to prevent condensation or moisture upon windows and other exposed surfaces and at the same time raising the value or range of the dry bulb temperature maintained in the space to compensate for such lowering in the relative humidity whereby the effective temperature is maintained substantially constant.

Another object of the invention is the provision of an improved heating system for a space wherein control means operate normally to maintain the space temperature above a predetermined minimum, together with means to increase the supply of fresh outdoor air to the space if the space temperature becomes excessive for any reason. Such an excessive increase in space temperature might result from a sudden increase in the number of persons occupying the space.

A further object of the invention is the provision of a novel and improved fresh air supply control wherein the supply of fresh air is controlled in one manner when the apparatus is operating on a winter cycle and in a different manner when the apparatus is operating on a summer cycle. Specifically, when the apparatus is operating on a winter cycle, the supply of fresh air is increased if the space temperature becomes excessive whereas the supply of fresh air is decreased upon either a rise or fall of an outdoor condition above and below an optimum value when the apparatus is operating on a summer cycle.

Another object of the invention is the provision of a novel heating control wherein a heating means is controlled to maintain a substantially constant temperature during the winter and is additionally controlled in the summer to prevent too low a temperature as a result of removal of moisture from the space by a temperature lowering process.

A further object of the invention is the provision of an improved automatic control for changing the system from winter operation to summer operation wherein this change is effected through the combined action of means responsive to a condition in the space and a condition of the outside atmosphere. More specifically, the apparatus is maintained on a summer cycle if either the space temperature is above a predetermined value or within a predetermined relatively narrow range of temperature or if the outside temperature is within a predetermined range which is larger than the aforesaid range of indoor or space temperature. In the particular embodiment to be hereinafter described, this change-over is accomplished by electrical means which places the system on summer operation whenever such electrical means is energized and the energization of this electrical means is controlled by two parallel circuits, one of which is completed whenever the space temperature is above a predetermined value and the other of which is controlled by an outdoor temperature responsive thermostat, having a relatively wide differential of operation.

Further objects of the invention include all of the phases of operation of the winter system, all the phases of operation of the summer system, the operation of the complete system, both summer and winter, and combinations of various specific phases of control hereinbefore set forth and which will be found in the drawings, the detailed description, and the appended claims.

For a more complete understanding of the invention, reference may be had to the following description and accompanying drawings, in which.

Figure 1:
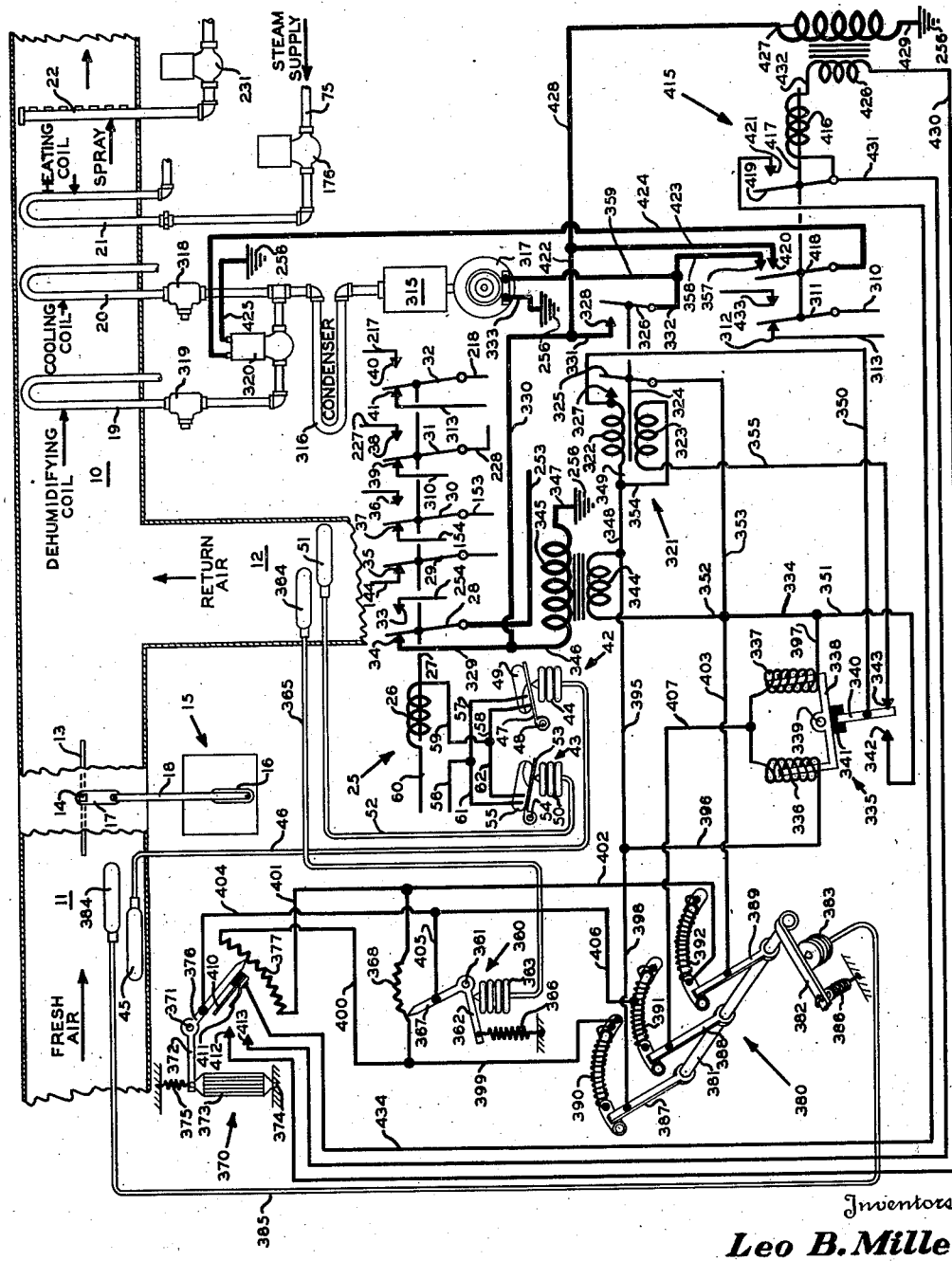
Fig. 1 is a diagrammatic showing of the general layout of the system together with a specific showing of the summer-winter change-over mechanism as well as the summer cooling and dehumidifying control.

Referring to Fig. 1 of the drawings, an air-conditioning unit or an apparatus is herein diagrammatically shown as comprising an air conditioning chamber 10 in the form of a duct which communicates with a fresh air inlet duct 11 and a return air duct 12. The amount of fresh air taken in through the fresh air inlet duct 11 and delivered to the air conditioning chamber 10 is controlled by a damper 13 which is located in the fresh air inlet duct 11 and is pivoted upon a shaft 14. This shaft 14 is controlled by a motor mechanism 15 which drives a crank 16. This crank 16 is connected to a similar crank 17 that is secured to shaft 14. The cranks 16 and 17 are connected by a link 18. The manner in which the motor mechanism 15 controls the fresh air damper 13, both in the summer and the winter, will be explained in detail hereinafter.

Located within the air conditioning chamber 10 is a dehumidifying coil 19, a cooling coil 20, a heating coil 21, and a water spray 22. The dehumidifying coil 19 and the cooling coil 20 are adapted to be supplied with a suitable source of refrigerating medium under the control of proper temperature and humidity responsive controls in a manner to be explained hereinafter, and, similarly, the heating coil 21 is adapted to be supplied with suitable heating medium under the control of proper temperature controls and the water spray 22 is supplied with water for humidifying the air passing through the air conditioning chamber 10, all as will hereinafter appear.

*The summer-winter change-over mechanism*

The system of the present invention is constructed to condition air for a space both during the winter and during the summer so as to supply air at the proper temperature and humidity in relation to outdoor conditions. It is, of course, desirable to supply mechanism for changing the control system to winter operation or summer operation and vice versa and this mechanism will now be described.

The summer-winter change-over mechanism is entirely electrical and includes a relay generally indicated at 25. This relay 25 includes a relay coil 26 and a cooperating armature 27 which controls a plurality of switches. Specifically, the armature 27 controls switch arms 28, 29, 30, 31 and 32. The switch arm 28 cooperates with a pair of contacts 33 and 34, the arrangement being such that switch arm 28 engages contact 33 when the relay coil 26 is deenergized and engages contact 34 when the relay coil 26 is energized. The switch arm 29 cooperates with a single contact 35 and engages the same when the relay coil 26 is energized. The switch arm 30 cooperates with two contacts 36 and 37, and the arrangement is such that switch arm 30 engages contact 36 when relay coil 26 is deenergized and engages contact 37 when this relay coil is energized. Switch arms 31 and 32 both cooperate with pairs of contacts, switch arm 31 cooperating with contacts 38 and 39 whereas switch arm 32 cooperates with contacts 40 and 41. The arrangement is such that switch arm 31 engages contact 38 and switch arm 32 engages contact 40 when relay coil 26 is deenergized. On the other hand, switch arm 31 engages contact 39 and switch arm 32 engages contact 41 when the relay coil 26 is energized. Energization of relay coil 26 is controlled by a pair of thermostats, one of which is designated at 42 and responds to outdoor temperatures, and the other of which is designated at 43 and responds to the temperature of the space being controlled.

The outdoor thermostat 42 comprises a pressure responsive actuator in the form of a bellows 44 which is connected to a controlling bulb 45 by means of an interconnecting tube 46. The bellows, bulb and tube are all charged with a suitable amount of expansible fluid as is well-known in the art. The controlling bulb 45 may be located in any desired position so as to respond to outdoor temperature and is herein shown as conveniently located in the fresh-air inlet duct 11. The bellows 44 operates a switch carrier 47 which is pivoted at 48 and supports a mercury switch 49. This thermostatic switching mechanism is so arranged that mercury switch 49 is moved to circuit closed position when the outdoor temperature rises to 75° F. and remains in circuit closed position until the outdoor temperature falls to 65° F.

The indoor temperature responsive switching mechanism 43 is similar to the outdoor temperature responsive switching mechanism 42 and also includes a pressure responsive actuator in the form of a bellows 50. This bellows 50 is connected to a controlling bulb 51 by a suitable connecting tube 52 and the bellows, bulb and connecting tube are charged with a suitable amount of volatile or expansible fluid as is well-known in the art. The bellows 50 operates a switch support 53 that is pivoted at 54. The switch support 53 carries a mercury switch 55.

The controlling bulb 51 may be located in any suitable place so that it responds to indoor temperature and is herein shown as conveniently located in the return air duct 12. The arrangement of this indoor thermostatic switching mechanism 43 is such that the mercury switch 55 moves to closed position whenever the indoor temperature rises to 75° F. or thereabove and moves to open position whenever the indoor temperature falls below 75° F.

The mercury switches 49 and 55 of the outdoor temperature responsive controller 42 and the indoor temperature responsive controller 43 are connected in parallel for the purpose of energizing and deenergizing the relay coil 26. Either the mercury switch 49 or the mercury switch 55 can cause energization of the relay coil 26. The circuit for relay coil 26 that is controlled by mercury switch 49 is as follows: line wire 56, wire 57, mercury switch 49, wire 58, wire 59, relay coil 26 and line wire 60. Similarly, the circuit by which relay coil 26 is controlled by the mercury switch 55 is as follows: line wire 56, wire 61, mercury switch 55, wire 62, wire 59, relay coil 26 and line wire 60.

From the foregoing description, it will be evident that whenever the outdoor temperature rises to 75° F., the mercury switch 49 will be closed and the relay coil 26 will be energized. The relay coil 26 will then remain energized until the outdoor temperature falls to 65° F., so as to open mercury switch 49. The mercury switch 55 exerts a supplemental control in that it causes energization of the relay coil 26 whenever the indoor temperature is at or above 75° F., whereby the relay coil 26 cannot be deenergized even though the mercury switch 49 be opened. In this manner, placing of the system on winter operation when the outdoor temperature is below 65° F. or when the outdoor temperature is below 75° F. when it has formerly been below 65° F. (the mercury switch 49 being open under either condition) is prevented in the event the indoor temperature is 75° F. or thereabove. Under these conditions, it will be obvious that a heating action is not necessary or desirable. With the parts in the position shown, it will be evident that the outdoor temperature has recently been at or above 75° F. since the mercury switch 49 is closed. It will be further evident that the outdoor temperature is not below 65° F. because the mercury switch 49 is closed, but the indoor temperature is below 75° F. since switch 55 is open. Under these conditions, the relay coil 26 is energized and the relay 25 has its parts positioned as shown in Fig. 1 so that the system is operating on its summer cycle.

*Fresh air damper control*

Figure 2:
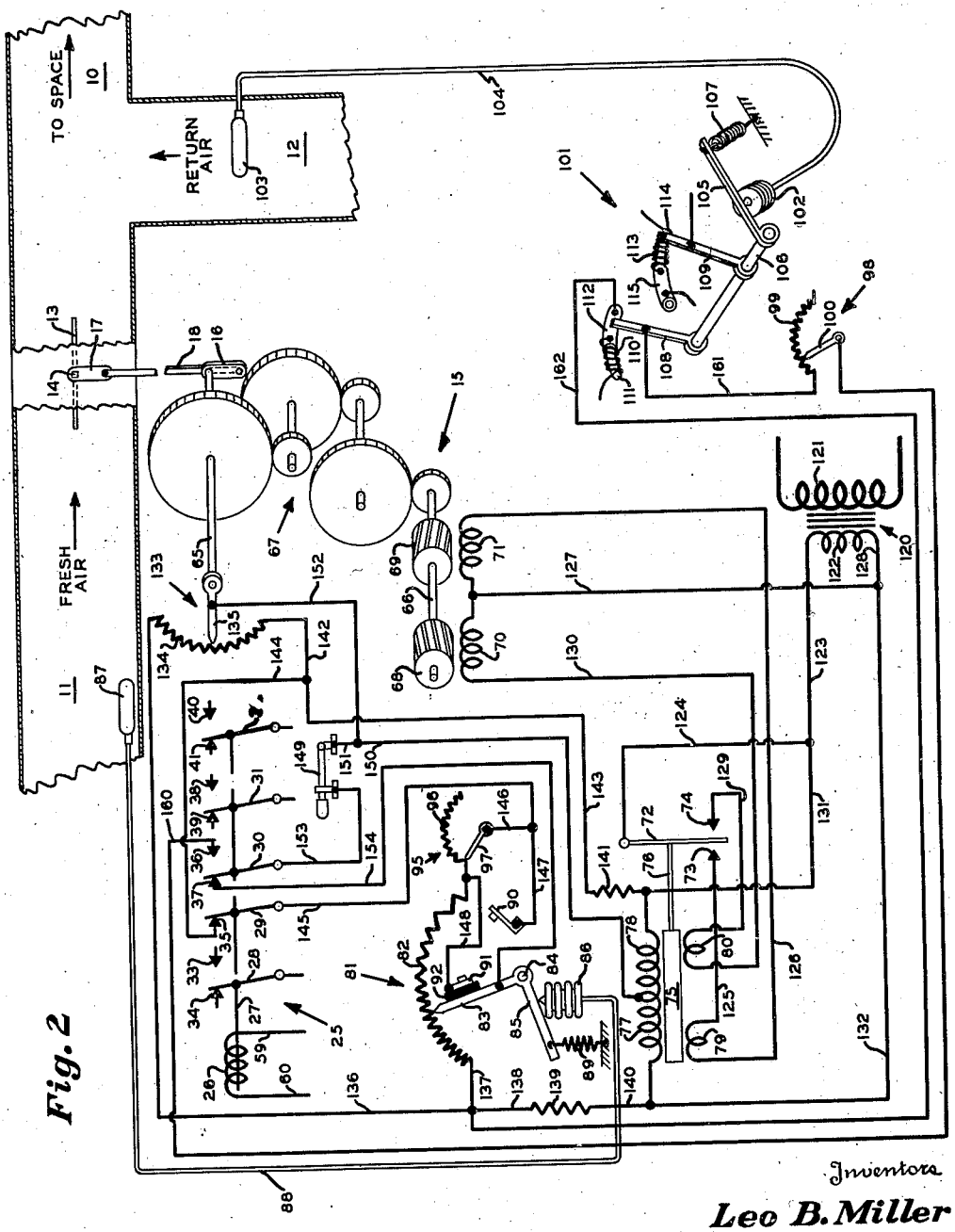
Fig. 2 is a detailed showing of the manner in which the fresh air damper is controlled, both in the summer and the winter.

Turning now to Fig. 2 of the drawings, the motor mechanism 15 which controls the fresh air damper 13 is shown in detail, as are the various control means for this motor mechanism 15. The motor mechanism 15 includes a main operating shaft 65 to which the crank 16 is secured. This main operating shaft 65 is connected to rotor shaft 66 through suitable reduction gearing, generally indicated at 67. Secured to this rotor shaft 66 are two rotors 68 and 69. A field winding 70 cooperates with the rotor 68 and a similar field winding 71 cooperates with the rotor 69. The arrangement is such that rotor 68 rotates rotor shaft 66 in one direction when its associated field winding 70 is operatively energized and the rotor 69 rotates the rotor shaft 66 in the opposite direction when its associated field winding 71 is operatively energized. It will therefore be seen that the two motors comprised by the rotors 68 and field winding 70 and the rotor 69 and field winding 71 comprise a form of reversible motor means.

Operative energization of the field windings 70 and 71 is controlled by a double-circuit switching mechanism which comprises a movable switch arm 72 that is disposed between a pair of cooperating contacts 73 and 74. The switch arm 72 is positioned by a single magnetic plunger 75 which is connected thereto through a suitable non-magnetic and non-conducting connection 76. This single plunger 75 is primarily controlled by a pair of normally equally energized coils 77 and 78 which may take the form of entirely separate coils or may conveniently be arranged by providing a single coil with a center-tap. The plunger 75 is additionally controlled by a pair of auxiliary windings 79 and 80, each of which is provided with a relatively small number of turns.

The energizations of solenoid coils 77 and 78 are always maintained substantially equal or the energizations thereof are immediately equalized as will become apparent hereinafter. During the summer, unbalancing of the energizations of the solenoid coils 77 and 78 results from changes in outdoor temperature and is brought about through the agency of an outdoor temperature responsive variable resistance controller or potentiometer thermostat indicated generally at 81.

This potentiometer thermostat 81 includes a resistance coil 82 and a cooperating contact arm 83 which forms one arm of a bell crank that is pivoted at 84. The other arm 85 of this bell crank is operated by a pressure responsive device herein shown in the form of a bellows 86. This bellows 86 is connected to a controlling bulb 87 by means of a tube 88. The bellows, controlling bulb and tube are charged with a suitable volatile or expansible fluid and the pressure created thereby is opposed by a spring 89 which acts upon the arm 85 of the bell crank in a well-known manner. The controlling bulb 87 may be located at any desired place so long as it responds to outdoor temperature and is herein shown as conveniently located in the fresh air inlet duct 11. The controlling resistance 82, instead of being wound uniformly, is wound in a tapered fashion so that the amount of resistance change per unit of movement of the contact arm 83 varies as the contact arm 83 moves from one end of this resistance 82 to the other end thereof. The arrangement is such that contact arm 83 traverses the complete resistance 82 upon a 15 degree change in outdoor temperature, the contact arm 83 engaging the left-hand end of resistance 82 when the outdoor temperature is 65° F. and engaging the right-hand end thereof when the outdoor temperature is 80° F. The tapered winding of the resistance 82 is of such nature that when the outdoor temperature is 70° F., so that the contact arm 83 is in the position shown, this contact arm 83 engages the electrical center of the resistance 82 although it is disposed to the left of the geometric center thereof. As a result, if the temperature falls from 70° F. to 65° F., the contact 83 will traverse the same amount of effective resistance as if the temperature rises from 70° F. to 80° F. It will be understood, of course, that these values just set forth are only one of many possible sets of conditions that may be utilized in controlling the fresh air damper 13.

The controller 81 also includes an auxiliary switch that comprises a stationary switch arm 90 and a cooperating movable switch arm or contact 91 which is operated by contact arm 83.

In Fig. 2 of the drawings, this is shown as being accomplished by connecting the contact 91 to the contact arm 83 through the medium of a piece of insulation 92. The arrangement is such that the contact 91 engages the switch arm 90 when the outdoor temperature has risen to some excessive value such as 85° F. It will therefore be evident that the contact 91 does not engage the switch arm 90 until the outdoor temperature has risen sufficiently to cause contact arm 83 to completely traverse the resistance 82 and pass beyond the right-hand end thereof. During the summer, the energizations of the solenoid coils 77 and 78 are also adapted to be controlled to a minor extent by means of a manually operable rheostat 95 which comprises a resistance 96 and cooperating contact arm 97.

During the winter operation, the respective energizations of coils 77 and 78 are adapted to be manually varied by a manual rheostat 98 that includes a resistance 99 and a cooperating contact arm 100. The energizations of these solenoid coils 77 and 78 are additionally adapted to be controlled automatically, under certain abnormal conditions, by means of a portion of a temperature responsive controller, generally indicated at 101. This temperature responsive controller 101 responds to the temperature of the space and includes a pressure responsive actuator in the form of a bellows 102 that is connected to a controlling bulb 103 by means of a connecting tube 104. The bellows, tube and controlling bulb are suitably charged with volatile or expansible fluid, as is usual in the art. The bellows 102 operates an arm 105 which is secured to a shaft 106. A spring 107 opposes movement of the arm 105 by the bellows 102. This shaft 106 carries two contact arms 108 and 109. Contact arm 108 cooperates with a resistance 110 that is wound upon a support 111. One end of this resistance 110 is connected to a conducting sleeve 112 which is likewise mounted upon the support 111. In a similar manner, the contact arm 109 cooperates with a resistance 113 which is wound upon a support 114 and is also adapted to slide upon a conducting sleeve 115 which is mounted upon this same support 114. As before stated, the thermostatic controller 101 responds to the temperature of the space being controlled and the controlling bulb 103 may be located in any suitable portion of said space but is here shown conveniently located in the return air duct 12. With the prevailing temperature at 70° F., the contact arm 109 is engaging resistance 113 at its right-hand end and the contact arm 108 is engaging sleeve 112. When the temperature rises to 74° F., contact arm 109 is moved to the left-hand end of resistance 113 and contact arm 108 is moved to the right-hand end of resistance 110. If the temperature continues to rise until it reaches 78° F., the contact arm 109 merely moves along the sleeve 115 but the contact arm 108 completely traverses the resistance 110 and is then positioned at the extreme left-hand end thereof. The contact arm 109 and the cooperative resistance 113 are utilized in the winter control of the heating coil 21 as will become apparent hereinafter (see Fig. 3) and contact arm 108 and its resistance 110 cooperates with the manual rheostat 98, under certain abnormal conditions, to control the fresh air damper 13 during the winter operation of the apparatus.

Low voltage electrical power is supplied to the motor mechanism 15 and the associated solenoid coils, auxiliary windings and resistances by means of a step-down transformer 120 that is provided with a high voltage primary 121 which is connected to suitable line wires. The step-down transformer 120 is also provided with a low voltage secondary 122. Whenever the switch arm 72 engages contact 73, the field winding 71 and the auxiliary winding 79, in series, are energized by a circuit as follows: secondary 122, wire 123, wire 124, switch arm 72, contact 73, wire 125, auxiliary winding 79, wire 126, field winding 71, wire 127 and wire 128 to the other side of secondary 122. Similarly, whenever the switch arm 72 engages contact 74, the field winding 70 and the auxiliary winding 80, in series, are energized by a circuit as follows: secondary 122, wire 123, wire 124, switch arm 72, contact 74, wire 129, auxiliary winding 80, wire 130, field winding 70, wire 127 and wire 128 to the other side of secondary 122. The solenoid coils 77 and 78, in series, are connected across secondary 122 by wires 123, 131, 132 and 128.

Irrespective of whether the system is operating on a summer or winter cycle and irrespective of what particular automatic or manual controller causes an unbalance in the energizations of solenoid coils 77 and 78, these energizations are rebalanced by a balancing potentiometer, generally indicated at 133, which comprises a balancing resistance 134 and a balancing contact finger 135. The balancing contact finger 135 is secured to the main operating shaft 65 of the motor mechanism 15 so as to be positioned thereby. The upper end of balancing resistance 134 and the left-hand end of control resistance 82 are interconnected by wires 136 and 137 and are connected to the left-hand end of solenoid winding 77, through a protective resistance 139, by wires 138 and 140. The lower end of balancing resistance 134 is connected to the right-hand end of solenoid coil 78, through a protective resistance 141, by wires 142 and 143. The contact 35 of the change-over relay 25 is connected to the junction of wires 142 and 143 by a wire 144. The associated switch arm 29 is connected to the contact arm 97 of rheostat 95 and to the switch arm 90 by wires 145, 146 and 147. One end of resistance 96, the right-hand end of control resistance 82, and the contact 91 are inter-connected by a wire 148. The junction of solenoid coils 77 and 78 is connected to a manual switch 149 and to the balancing contacting finger 135 by wires 150, 151 and 152. The manual switch 149 is also connected to switch arm 30 of the change-over relay 25 by a wire 153. The cooperating contact 37 is connected to the control contact arm 83 by a wire 154.

With the parts in the positions shown, the contact arm 97 of the manual rheostat 95 is engaging the extreme left-hand end of resistance 96 so that none of this resistance is connected in the circuit. Also, the control contact 83 is engaging the electrical center of the control resistance 82 and the balancing contact finger 135 is engaging the electrical center, as well as the geometrical center, of balancing resistance 134. Equal portions of control resistance 82 and equal portions of balancing resistance 134 are therefore connected in parallel with the solenoid coils 77 and 78 so that both of the solenoid coils are traversed by the same amount of current. The magnetic plunger 75 is therefore centrally positioned, as shown, and the switch arm 72 is intermediate contacts 73 and 74 so that neither of the field windings 70 or 71 is energized and the main operating shaft 65 is stationary. Under these conditions, the fresh air damper 13 is in a horizontal position in which a full flow of fresh air is permitted through the fresh air duct 11. This is the position of the fresh air damper 13 during summer operation when the outdoor temperature is 70° F.

Now, if the outdoor temperature should fall somewhat, control contact 83 will move along control resistance 82 towards its left-hand end. This reduces the amount of control resistance 82 which is connected in parallel with the solenoid coil 77 so that more current flows through this portion of the control resistance 82 and less flows through the solenoid coil 77, whereupon the energization of solenoid coil 77 is reduced below that of solenoid coil 78. When this difference in current flows becomes sufficiently great, plunger 75 will move to the right sufficiently far to bring switch arm 72 into engagement with contact 74. When this occurs, field winding 70 is energized by the circuit described above and the auxiliary winding 80 is likewise energized. This energization of the small auxiliary winding 80 exerts further magnetic force on plunger 75 tending to move the same towards the right and thereby increases the pressure between switch arm 72 and contact 74. Energization of field winding 70 causes rotation of its associated rotor 68 in such direction that main operating shaft 65 is rotated in a counter-clockwise direction as viewed from the left. As a result, the crank 16 is rotated in a similar direction and the fresh air damper 13 rotates in a counter-clockwise direction towards a vertical position in which less air is allowed to flow through the fresh air inlet duct 11. This counterclockwise rotation of main operating shaft 65 causes balancing contact finger 135 to move along balancing resistance 134 toward its lower end. As this balancing contact finger 135 moves along the balancing resistance 134 towards the lower end thereof, less of the balancing resistance 134 is in parallel with the solenoid coil 78 so that the current flow through the solenoid coil 78 is reduced in respect to the flow of current through solenoid coil 77. When the balancing contact finger 135 has traveled along balancing resistance 134 in this direction sufficiently far to substantially equalize the energizations of solenoid coils 77 and 78, plunger 75 moves back toward its central position far enough to move switch arm 72 from engagement with contact 74. The auxiliary winding 80 and the field winding 70 are thereupon deenergized. Deenergization of auxiliary winding 80 removes the additional attracting force tending to move plunger 75 to the right, whereupon plunger 75 moves further to the left so that switch arm 72 is widely spaced from contact 74 as well as from contact 73 thereby insuring a good clean break between switch arm 72 and contact 74. Deenergization of field winding 70 stops the counterclockwise rotative movement of main operative shaft 65. The damper 13 has now been rotated toward its vertical position in a counter-clockwise direction so as to reduce the flow of fresh air through the fresh air duct 11. This new position of damper 13 corresponds to the new position of control contact 83 upon control resistance 82.

If the outdoor temperature should fall to 65° F., control contact 83 will engage the extreme left-hand end of control resistance 82 and solenoid coil 77 will thereupon be substantially short-circuited. Starting with the junction of solenoid coils 77 and 78, this substantial short-circuit for solenoid coil 77 can be traced by way of wire 150, wire 151, manual switch 149, wire 153, switch arm 30, contact 37, wire 154, control contact 83, wire 137, wire 138, protective resistance 139 and wire 140 to the left-hand end of solenoid coil 77. This circuit does not completely short-circuit solenoid coil 77 by reason of inclusion of the protective resistance 139 therein but the amount of current flowing through solenoid coil 77 under these conditions is relatively small. However, this current flow is large enough to exert an attractive force upon the plunger 75. Solenoid coil 78 is now again more highly energized than the associated solenoid coil 77 whereupon plunger 75 will once more move to the right and bring switch arm 72 into engagement with contact 74. Auxiliary winding 80 and field winding 70 will now be energized, in series, by the circuit described above. The main operating shaft 65 is again rotated in a counter-clockwise direction and will continue to so operate until balancing contact finger 135 engages the extreme lower end of balancing resistance 134. At this time, solenoid coil 78 is also substantially short-circuited by a circuit which is as follows: starting with the junction of solenoid coils 77 and 78, wire 150, wire 152, balancing contact finger 135, wire 142, wire 143, and protective resistance 141 to the right-hand end of solenoid coil 78. The energizations of solenoid coils 77 and 78 are now again substantially equalized whereupon switch arm 72 will move from engagement with contact 74. Auxiliary winding 80 and field winding 70 are thus deenergized. Deenergization of auxiliary winding 80 again results in a further leftward movement of plunger 75 so as to widely space switch arm 72 from the contact 74. As a result of deenergization of field winging 70, further counter-clockwise rotating movement of main operating shaft 65 ceases. This quarter revolution of main operating shaft 65 in counter-clockwise direction which has now taken place, positions fresh air damper 13 in its vertical position so that no fresh air is permitted to flow through the fresh air duct 11.

If the outdoor temperature should rise somewhat, the control contact 83 will move along control resistance 82 towards its right-hand end, it being remembered that it is now at the extreme left-hand end thereof. Part of the control resistance 82 is thereupon placed in parallel with the solenoid coil 77 whereupon more current flows through this solenoid coil than flows through solenoid coil 78. When this temperature rise has been sufficient, the solenoid coil 77 will be sufficiently more highly energized than the solenoid coil 78 to cause plunger 75 to move to the left and bring switch arm 72 into engagement with contact 73. When this occurs, the auxiliary winding 79 and the field winding 71, in series, are energized by the circuit set forth above. Rotor 69 now drives main operating shaft 65 in a clockwise direction as viewed from the left. Balancing contact finger 135 therefore begins moving upwardly along balancing resistance 134 and the fresh air damper 13 is rotated in a clockwise direction back toward the horizontal position which it originally assumed. As balancing contact finger 135 moves upwardly along the balancing resistance 134, part of this balancing resistance 134 is placed in parallel with solenoid coil 78 so that the current flow through this solenoid coil increases. When the energizations of solenoid coils 77 and 78 have been substantially rebalanced, plunger 75 will move far enough to the right to disengage switch arm 72 from contact 73. The auxiliary winding 79 and the field winding 71 are thereupon deenergized. Deenergization of the auxiliary winding 79 removes the additional attractive force upon plunger 75, tending to move the same to the left whereby plunger 75 moves further to the right and widely spaces switch arm 72 from contact 73. The deenergization of field winding 71 causes main operating shaft 65 to cease its clockwise rotative movement so that further opening movement of fresh air damper 13 ceases. The fresh air damper 13 has now been moved toward the horizontal position which it originally assumed so that some flow of outdoor air is permitted through the outdoor inlet duct 11.

As the outdoor temperature continues to rise, the outdoor inlet damper 13 will continue to move in clockwise direction and when the outdoor temperature has returned to 70° F., the parts will again be in the position shown in Fig. 2 wherein the fresh air damper 13 is in its horizontal position and a full flow of outdoor air is permitted through the fresh air inlet duct 11. If the outdoor temperature should continue to rise, the clockwise rotation of the main operating shaft 65 will continue as will the clockwise movement of fresh air damper 13 which now moves towards its vertical position while moving in clockwise direction and thereby again reduces the flow of fresh air through the fresh air inlet duct 11. If the outdoor temperature rises to 80° F., the control contact 83 will engage the extreme right hand end of control resistance 82, whereupon the balancing contact finger 135 must move to the extreme upper end of balancing resistance 134 before the energizations of solenoid coils 77 and 78 are again substantially balanced. As a result, the fresh air damper 13 will again have been moved to its vertical position by this time by reason of clockwise rotation rather than counterclockwise rotation.

It is usually desired to maintain a small flow of fresh outdoor air into the air conditioning chamber, and therefore into the space to be conditioned, during the summer even though the outdoor temperature does become relatively high. If it be desired to do this, manually operable rheostat 95 is operated by moving manual contact arm 97 along the associated resistance 96 towards its right-hand end whereby part of the resistance 96 is placed in circuit with control resistance 82. If this be done, it will be apparent that when the control contact 83 engages the extreme right-hand end of control resistance 82, part of the resistance 96 will still be in parallel with the solenoid coil 78. Under these conditions, the current flow through solenoid coil 78 will not be reduced as much as if this portion of resistance 96 were not included in circuit therewith. As a result, balancing contact finger 135 will move to a position in which the energization of the solenoid coils 77 and 78 are substantially rebalanced without moving to the extreme upper end of balancing resistance 134. The amount of balancing resistance 134 left between its upper end and the balancing contact finger 135 will depend upon the amount of resistance 96 placed in circuit with the end of control resistance 82. As a result, the fresh air damper 13 will not be moved to its vertical position but will only be moved to a position approaching its vertical position whereby some flow of fresh air through the fresh air inlet duct 11 will be permitted. The amount of this minimum fresh air flow under hot weather conditions will depend entirely upon how much of the resistance 96 is manually placed in circuit with the control resistance 82.

Under excessive weather conditions, the cooling apparatus to be explained later may not be able to maintain the temperature of the space being controlled within the desired limits if this minimum amount of fresh air is being taken in. If the outdoor temperature should continue to rise until it reaches some higher value such as 85° F., the contact 91 will be moved into engagement with the switch arm 90. When this occurs, the effective portion of resistance 96 which has been manually placed in circuit with control resistance 82, will be shorted out by means of wire 147, switch arm 90, contact 91 and wire 148. Therefore, the short-circuiting of solenoid coil 78 will be just as complete as if none of this resistance 96 were in circuit with the control resistance 82. As a result, balancing contact finger 135 must move to the upper end of balancing resistance 134 before the solenoid coils 77 and 78 will again be substantially equally energized. It therefore follows, that fresh air damper 13 will be moved to its fully closed position.

To summarize the operation of the fresh air damper during the summer, this damper is placed in a horizontal position in which a full flow of fresh air is permitted through the fresh air inlet duct when the outdoor temperature is 70° F. If the outdoor temperature then falls 5 degrees to 65° F., this fresh air damper is moved to its closed position by moving in a counterclockwise direction. If, on the other hand, the outdoor temperature rises 10 degrees to 80° F., this damper will be moved to its vertical position in which no flow of fresh air is permitted by moving in a clockwise direction. In this manner, as the outdoor temperature rises from 65° F. to 80° F., or falls from 80° F. to 65° F., the fresh air damper is moved from a closed position to an open position and back to a closed position again. If it be desired to always take in a minimum supply of outdoor air, except under abnormal conditions, this can be done by manual manipulation of the rheostat 95. If the manually operable rheostat is so manipulated, a minimum flow of fresh air will be maintained even though the outdoor temperature rises to 80° F., and the amount or volume of this minimum flow will depend upon the adjustment of manual rheostat 95. However, if the outdoor air temperature should become excessive by rising to 85° F., the effective portion of resistance 96 of the manually operable rheostat will be short-circuited whereupon the fresh air damper will move to its full closed position just as if this manually operable rheostat had not been adjusted.

Whenever the outdoor temperature falls below 65° F., and provided that the indoor temperature is below 75° F., the relay coil 26 of the changeover relay 25 will be deenergized as previously set forth. The system is thereupon operated upon the winter cycle instead of the summer cycle. Such deenergization of relay coil 26 causes switch arm 29 to disengage contact 35. Thereupon, the contact arm 97 of the rheostat 95 is disconnected from the right-hand end of solenoid coil 78. Also, switch arm 30 disengages contact 37 and this results in the control contact 83 being disconnected from the balancing contact finger 135 and from the junction of solenoid coils 77 and 78. The outdoor controller 81 and the manually operable rheostat 95 therefore now have no effect upon the respective energizations of solenoid coils 77 and 78. With switch arm 30 engaging contact 36, the rheostat 98, the controller comprised by contact arm 108 and resistance 110 and the protective resistance 139, all in series, are connected across or in shunt circuit relationship with solenoid coil 77. This parallel or shunt circuit is as follows: starting with the junction of solenoid coils 77 and 78, wire 150, wire 151, manual switch 149, wire 153, switch arm 30, contact 36, wire 160, contact arm 100, resistance 99, wire 161, contact arm 108, sleeve 112 (with the parts in the position shown) wire 162, wire 138, protective resistance 139, and wire 140 to the left end of solenoid coil 77. It will therefore be noted that with the change-over relay 25 in its winter position, the control resistance 82 and manual rheostat 95 are disconnected from the solenoid coils 77 and 78 but that the balancing resistance 134 is still connected in parallel therewith. Also, it will be seen that the rheostat 98, the resistance 110 and the protective resistance 139, all in series, are connected in parallel with the solenoid coil 77. This parallel circuit has just been described above and, with the manual contact arm 100 positioned as shown and with the temperature at 70° F., so that contact arm 108 is engaging the conducting sleeve 112, very little resistance is in parallel with the solenoid coil 77 other than the protective resistance 139. It therefore follows that the solenoid coil 78 is more highly energized than the solenoid coil 77 whereupon plunger 75 moves to the right and brings switch arm 72 into engagement with contact 74. The auxiliary winding 80 and field winding 70, in series, are therefore energized by the circuit given above. Energization of field winding 70 causes rotation of main operating shaft 65 in counter-clockwise direction and such counter-clockwise rotation will continue until the balancing contact finger 135 has almost reached the lower end of balancing resistance 134 so as to rebalance the energizations of the solenoid coils 77 and 78. If none of the manual resistance 99 were in circuit with the solenoid coil 77, the balancing contact finger 135 would be moved to the extreme downward end of balancing resistance 134, but, with this small amount of resistance 99 connected in circuit with solenoid coil 77, the balancing contact finger 135 assumes a position which is quite close the lower end of balancing resistance 134. Rebalancing of the energizations of solenoid coils 77 and 78 causes the switch arm 72 to move away from contact 74 whereupon field winding 70 is deenergized and further rotation of main operating shaft 65 ceases. Such counter-clockwise rotation of main operating shaft 65 moves damper 13 in a counter-clockwise direction towards its vertical position, and this damper 13 is thus moved to a position in which it is nearly vertical and wherein only a small amount of fresh air is permitted to flow through the fresh air inlet duct 11. It will, therefore, be seen that when the temperature of the room or space is at 70° F., the fresh air damper 13 is positioned according to the adjustment of the manual rheostat 98. By the use of this manual rheostat 98, the fresh air damper 13 can be caused to assume a minimum open position at all times so that there will always be a small amount of fresh air taken into the air conditioning chamber 10 or the fresh air damper 13 can be caused to move to its completely closed position, all depending upon the adjustment of this rheostat 98.

Suitable controls to be described later operate to maintain the space temperature constant in the winter, or within given limits. But if the temperature of the space to be controlled should rise for any reason, the contact arm 108 will sweep across the conducting sleeve 112 and when the indoor temperature has risen to 74° F., the contact arm 108 engages the extreme right end of the associated resistance 110. If there should be a further increase in the indoor temperature, contact arm 108 will begin to move across the associated resistance 110 whereby a larger amount of resistance is placed in parallel with the solenoid coil 77. As a result, the energizations of the solenoid coils 77 and 78 will only be balanced when the balancing contact finger 135 is in a position further removed from the extreme downward end of balancing resistance 134. Under these conditions, the fresh air damper 13 is more widely opened. If the indoor temperature or the temperature of the space should for any reason rise to 78° F., then all of the resistance 110 will be placed in parallel with the solenoid coil 77. Under these conditions, the value of resistance 110 is so chosen that the fresh air damper 13 will be moved substantially to its horizontal position so that a full flow of fresh air is permitted through the fresh air inlet duct 11.

By this arrangement, when the space temperature is normal or is within a desired or permissible range of fluctuation, the fresh air damper 13 will be completely closed or may be positioned in a slightly open position by operation of the rheostat 98. But if the indoor or space temperature rises above this normal temperature, then the fresh air damper 13 is opened more and more widely until, at 78° F., this damper is moved to its full open position. In this manner, more and more fresh air is taken into the space to be controlled as the temperature becomes excessive whereby to cause a lowering in such temperature.

The manual switch 149 provides for the manual moving of damper 13 to its full open position at any time, irrespective of whether the system be operating on a winter cycle or a summer cycle. When this manual switch 149 is opened, the junction of the solenoid coils 77 and 78 and the balancing contact finger 135 are disconnected from the contact arm 83 (if the apparatus be operating on a summer cycle) or from the rheostat 98 and the contact arm 108 (if the system be operating on the winter cycle). As a result, none of these various control resistances or the manual rheostats are effective to vary the respective energizations of the solenoid windings 77 and 78. Their respective energizations are then controlled entirely by the balancing potentiometer 133. The energizations of solenoid coils 77 and 78 will then only be equal when the balancing contact finger 135 is engaging the center of the balancing resistance 134. It therefore follows that whenever the manual switch 149 is moved to open position, the main operating shaft 65 is moved into the position shown in Fig. 2 wherein the damper 13 is completely open. This permits the taking into the air conditioning chamber 10 of a complete supply of fresh air under manual control irrespective of the indoor or outdoor temperatures and irrespective of whether the system is operating on a summer or winter cycle. Such a complete opening of damper 13 under manual control can, for instance, be utilized for the purpose of ventilation when it is desired to air out the space being controlled.

While a single inlet damper has been shown which is in control of the flow of fresh air to the air conditioning chamber, it will be readily appreciated that movement of this fresh air damper also indirectly affects the flow of air through return air duct 12. It is to be further understood that the usual cooperatively acting dampers in the fresh air and return air ducts could be used herein instead of the single damper.

Heating and humidifying control

Figure 3:
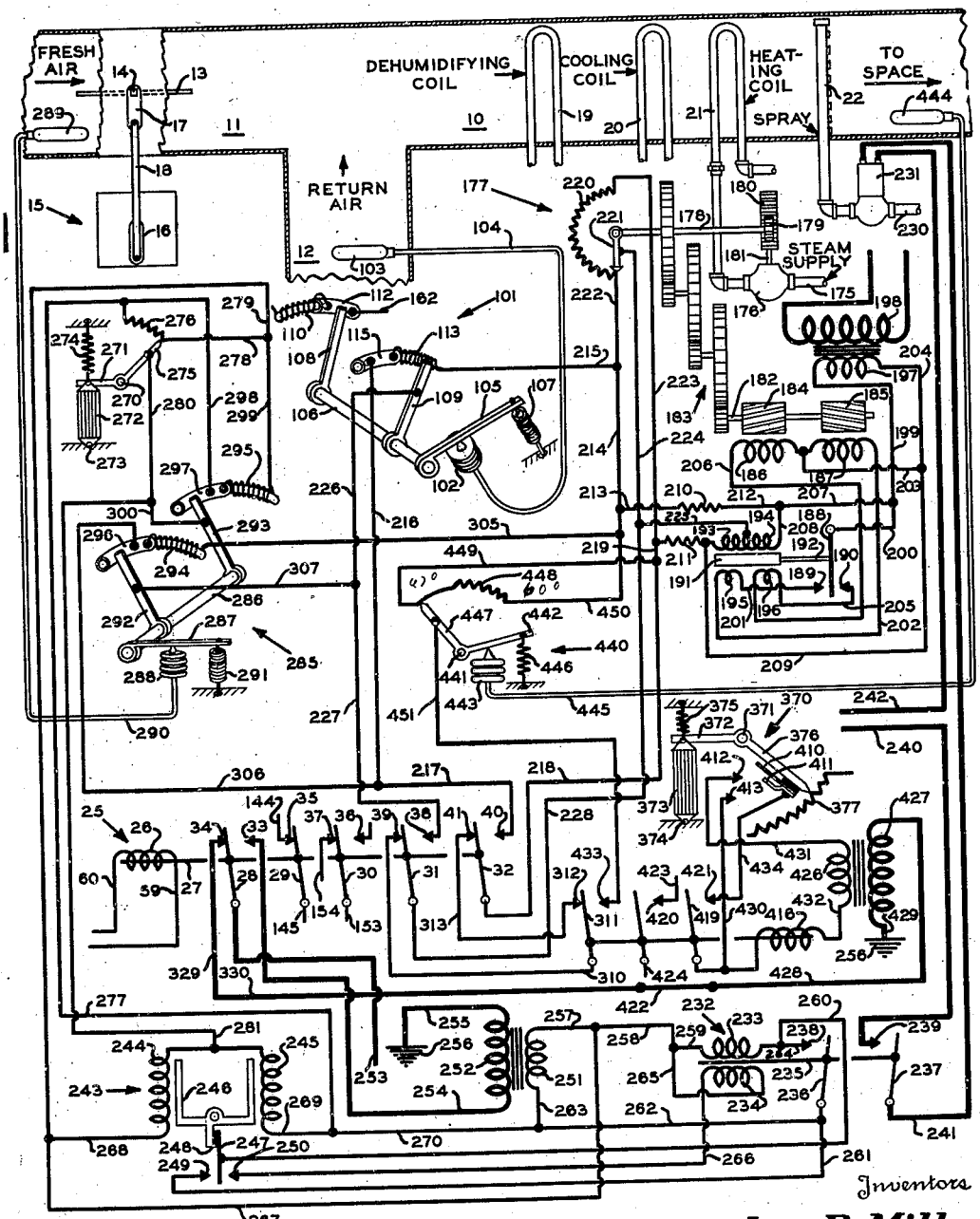
Fig. 3 is a detailed showing of the winter heating control as well as the dehumidifying control.

Turning now to Fig. 3 of the drawings, the heating coil 21 may be supplied with any suitable type of heating fluid and is herein shown as being supplied with steam from a steam supply pipe 175 which may be connected to a central power plant, district steam line, individual boiler or the like. The flow of steam from the steam supply pipe 175 to the heating coil 21 is controlled by a valve 176. This valve 176 is in turn controlled by a motor mechanism generally indicated at 177. The motor mechanism 177 includes a main operating shaft 178 that drives a pinion 179 which in turn cooperates with a rack 180 that is secured to the valve stem 181 of the valve 176. This main operating shaft 178 is connected to a rotor shaft 182 through suitable reduction gearing indicated generally at 183. The rotor shaft 182 carries a pair of rotors 184 and 185 with which field windings 186 and 187 cooperate. The arrangement is such that energization of field winding 186 causes its associated rotor 184 to turn in one direction whereas energization of field winding 187 causes its associated rotor 185 to rotate in the opposite direction. Therefore, the two rotors and their associated field windings constitute a reversible motor means.

Energization of the field windings 186 and 187 is controlled by a switching mechanism that includes a switch arm 188 and a pair of cooperating contacts 189 and 190. The position of switch arm 188 is controlled by a magnetic plunger 191 to which it is secured by a non-magnetic and non-conducting connection 192. The position of plunger 191 is controlled primarily by a pair of normally electrically balanced oppositely acting solenoid coils 193 and 194. These solenoid coils 193 and 194 may be entirely separate or may be conveniently formed by providing a single coil with a center-tap. The position of plunger 191 is also additionally controlled, to a certain extent, by a pair of auxiliary windings 195 and 196.

Whenever solenoid coil 193 is more highly energized than solenoid coil 194 to a sufficient degree, switch arm 188 is moved into engagement with contact 189. When this occurs, auxiliary winding 195 and field winding 187, in series, are both energized, electrical power being furnished by the low voltage secondary 197 of a step-down transformer having a high voltage primary 198. This series circuit for auxiliary winding 195 and field winding 187 is as follows: secondary 197, wire 199, wire 200, switch arm 188, contact 189, wire 201, winding 195, wire 202, field winding 187, wire 203 and wire 204 to the other side of secondary 197. Similarly, when the solenoid coil 194 becomes sufficiently more highly energized than solenoid coil 193, switch arm 188 engages contact 190 whereupon the auxiliary winding 196 and the field winding 186, in series, are energized by a circuit as follows: secondary 197, wire 199, wire 200, switch arm 188, contact 190, wire 205, auxiliary winding 196, wire 206, field winding 186, wire 203 and wire 204 to the other side of secondary 197.

As stated above, the solenoid coils 193 and 194 are normally equally energized or electrically balanced. This is true since the solenoid coils 193 and 194, in series, are connected directly across the secondary 197 by a circuit as follows: secondary 197, wire 199, wire 207, wire 208, solenoid coil 194, solenoid coil 193, wire 209 and wire 204 to the other side of secondary 197. The energizations of solenoid coils 193 and 194 are adapted to be primarily unbalanced by means of a potentiometer controller which comprises the control resistance 113 and cooperating control contact 109 of the controller 101 which was previously described in connection with the control of fresh air damper 13 (see Fig. 2). When the change-over relay 25 is in its winter position, this control resistance 113 is connected in parallel with the series connected solenoid coils 193 and 194 through a pair of protective resistances 210 and 211. This parallel circuit is as follows: from the right-hand end of solenoid coil 194, wire 208, wire 212, protective resistance 210, wire 213, wire 214, wire 215, control resistance 113, conducting sleeve 115, wire 216, wire 217, contact 40, switch arm 32, wire 218, wire 219 and protective resistance 211 to the left-hand end of the solenoid coil 193. The energizations of solenoid coils 193 and 194 are adapted to be rebalanced irrespective of the particular controller or resistance which causes unbalancing thereof, by a balancing potentiometer which comprises a balancing resistance 220 and a balancing contact 221 which is driven by the main operating shaft 178. This balancing resistance 220 is permanently connected in parallel with the series connected solenoid coils 193 and 194, through the protective resistances 210 and 211 by a circuit as follows: from the right-hand end of solenoid coil 194, wire 208, wire 212, protective resistance 210, wire 213, wire 214, wire 222, balancing resistance 220 and wire 223 to the protective resistance 211 and the left-hand side of solenoid coil 193. Also, the balancing contact 221 is permanently connected to the junction of solenoid coils 193 and 194 by wires 224 and 225. The control contact 109 is connected to the junction of solenoid coils 193 and 194 when the change-over relay 25 is in its winter position by wire 226, wire 227, contact 38, switch arm 31, wire 228 and wire 225.

The control contact finger 109 sweeps back and forth across the control resistance 113 as the temperature of the space being controlled fluctuates between 70° F. and 74° F. as heretofore indicated. With the prevailing temperature at 70° F., if the change-over relay 25 is moved to winter position instead of the summer position shown, the control contact 109 being in engagement with the extreme right-hand end of control resistance 113, the solenoid coil 194 is substantially short-circuited, complete short-circuiting being prevented by protective resistance 210. This circuit is as follows: from the junction of solenoid coils 193 and 194, wire 225, wire 228, switch arm 31, contact 38, wire 227, wire 226, control contact 109, wire 215, wire 214, wire 213, protective resistance 210, wire 212, and wire 208 to the right-hand end of solenoid coil 194. This solenoid coil 194 is also substantially short-circuited by reason of the fact that the balancing contact finger 221 is engaging the lower end of balancing resistance 220, this circuit being as follows: from the junction of solenoid coils 193 and 194, wire 225, wire 224, balancing contact 221, wire 222, wire 214, wire 213, protective resistance 210, wire 212 and wire 208 to the right-hand end of solenoid coil 194. Therefore, plunger 191 will move to the left and bring switch arm 188 into engagement with contact 189 whereupon auxiliary winding 195 and field winding 187, in series, will be energized by the circuit described above. This energization of the auxiliary winding 195 causes an additional magnetic force to be applied to the plunger 191, tending to move the same to the left. This brings switch arm 188 into more firm engagement with contact 189. Energization of field winding 187 causes rotation of main operating shaft 178 in a clockwise direction as viewed from the left whereupon the rack 180 is raised and the valve 176 is moved toward open position. This clockwise rotation of main operating shaft 178 will continue until the balancing contact 221 has completely traversed the balancing resistance 220 and is engaging the wire 223. When this occurs, the solenoid coil 193 is substantially short-circuited, complete short-circuiting being prevented by the protective resistance 211. This circuit is as follows: from the junction of solenoid coils 193 and 194, wire 225, wire 224, balancing contact finger 221, wire 223 and protective resistance 211 to the left-hand end of solenoid coil 193. The energizations of solenoid coils 193 and 194 are now substantially equalized and the plunger 191 moves to the right sufficiently far to separate switch arm 188 and contact 189. Separation of this switch arm and associated contact interrupts the series circuit through the auxiliary winding 195 and the field winding 187. Deenergization of the auxiliary winding 195 removes the auxiliary attractive force tending to move plunger 191 towards the left, whereupon plunger 191 moves to its central position or further to the right so as to widely separate the switch arm 188 and the contact arm 189, thereby assuring a good clean break. Further rotation of main operating shaft 178, of course, ceases upon the deenergization of the field winding 187. The steam valve 176 is now completely open and a maximum flow of steam is permitted to the heating coil 21 whereby to heat the air passing through the air conditioning chamber 10.

Now, as the space temperature rises as a result of this heating action, the control contact 109 moves along the control resistance 113 towards its left-hand end. As this movement takes place, part of the control resistance 113 is placed in the shunt circuit above described for the solenoid coil 194, which shunt circuit formerly included only the protective resistance 210. This placing of further resistance in this circuit, increases the flow of current through the solenoid coil 194. The solenoid coil 193, however, remains substantially short circuited since the balancing contact finger 221 is at the extreme upper end of balancing resistance 220 and is engaged with the wire 223. Plunger 191 therefore moves to the right and when the amount of resistance 113 that has just been placed in this circuit has become sufficiently large, plunger 191 will move far enough to the right to bring switch arm 188 into engagement with contact 190. Thereupon the auxiliary winding 196 and the field winding 186, in series, are energized by the circuit formerly traced. This energization of auxiliary winding 196 causes a further attractive force to be applied to plunger 191, tending to move the same to the right whereupon switch arm 188 is moved into firm engagement with contact 190. Energization of field winding 186 causes counter-clockwise rotation of main operating shaft 178 as viewed from the left. This counter-clockwise rotation of main operating shaft 178 moves rack 180 downwardly to partially close valve 176 and also moves balancing contact 221 along balancing resistance 220 away from its upper end and towards its lower end. As the balancing contact 221 thus moves along balancing resistance 220, part of the balancing resistance 220 is placed in the formerly described shunt circuit for the solenoid coil 193 whereby the current flow therethrough is increased. When the balancing contact 221 has moved sufficiently far along balancing resistance 220, the energizations of solenoid coils 193 and 194 will be sufficiently nearly equalized to cause plunger 191 to move sufficiently far to the left to separate contact arm 188 and contact 190. The auxiliary winding 196 and the field winding 186 are thereupon deenergized. Deenergization of auxiliary winding 196 removes the supplemental force tending to move plunger 191 towards the right whereupon the contact arm 188 moves further away from the contact 190 and causes a good clean break. The deenergization of field winding 186 results in stopping of the main operating shaft 178. The valve 176 is now partially closed.

If the temperature of the space to be controlled should rise to 74° F., then the control contact 109 will engage the conductive sleeve 115. Under these conditions, the solenoid coil 193 will be substantially short-circuited irrespective of the position of the balancing contact 221 in relation to the balancing resistance 220. This substantial short circuit for the solenoid coil 193 is as follows: from the junction of solenoid coils 193 and 194, wire 225, wire 228, switch arm 31, contact 38, wire 227, wire 226, control contact 109, conductive sleeve 115, wire 216, wire 217, contact 40, switch arm 32, wire 218, wire 219 and protective resistance 211 to the left-hand end of solenoid coil 193. The plunger 191 again moves to the right and switch arm 188 moves into engagement with contact 190 whereupon the auxiliary winding 196 and field winding 186 are again energized. The main operating shaft 178 is again rotated in a counter-clockwise direction to move valve 176 in a closing direction and to move balancing contact 221 along balancing resistance 220 towards its lower end. The energizations of solenoid coils 193 and 194 will not now be substantially equalized until the balancing contact 221 resumes the position shown in Fig. 3 wherein it is engaging the wire 222 that connects with the extreme lower end of balancing resistance 220. When the balancing contact 221 reaches this position, the solenoid coil 194 will be substantially short-circuited by the shunt circuit formerly described. Thereupon, the plunger 191 will move switch arm 188 from engagement with contact 190 and the auxiliary winding 196 and the field winding 186 will again be deenergized. The valve 176 is now fully closed.

It will therefore be seen that with the apparatus thus far described, the steam valve 176 is moved from full open position to full closed position as the temperature of the space being controlled rises from 70° F. to 74° F. when the system is operating on a winter cycle. Similarly, the steam valve 176 is moved from its full closed position to its full open position as the space temperature being controlled falls from 74° F. to 70° F.

The system of the present invention also contemplates controlling the relative humidity of the air in the space during the winter by adding water to the air passing through the air conditioning chamber 10 whenever the relative humidity falls below a desired point. Further, the present invention contemplates varying the relative humidity maintained in this space upon fluctuations of the outdoor temperature, in such a manner that the value of the relative humidity in the space is lowered as the outdoor temperature falls.

In this manner, values of relative humidity are maintained such that the dew point of the air is always below the temperature of exposed windows and walls whereby condensation thereon is prevented.

In order to accomplish these functions, water is furnished to the spray 22 from any suitable source, herein indicated as a water supply pipe 230. The flow of water from the water supply pipe 230 to the water spray 22 is controlled by a solenoid valve 231. Energization of the solenoid valve 231 is controlled by a relay mechanism generally indicated at 232. This relay mechanism 232 includes an energizing coil 233 and a neutralizing or bucking coil 234, these two coils 233 and 234 cooperating in the control of an armature 235. Armature 235 controls a pair of switch arms 236 and 237 that respectively cooperate with contacts 238 and 239. Switch arm 237 and its cooperating contact 239 control a circuit to solenoid valve 231 which is as follows: line wire 240, contact 239, switch arm 237, wire 241, solenoid valve 231 and line wire 242. It will therefore be apparent that whenever switch arm 237 engages contact 239, solenoid valve 231 is energized to permit the flow of water from water supply pipe 230 to the water spray 22.

The relay mechanism 232 is controlled by a relay mechanism 243 which includes a pair of oppositely acting solenoid coils 244 and 245 that cooperate in the positioning of a single pivoted armature 246. Armature 246 controls a switch arm 247 to which it is secured through a piece of insulation 248. The switch arm 247 cooperates with a pair of contacts 249 and 250. Whenever switch arm 247 engages contact 249, the energizing coil 233 of relay mechanism 232 is energized, provided that electrical power is available. Electrical power is furnished by a transformer having a low voltage secondary 251 and a high voltage primary 252. This primary 252 is energized whenever the change-over relay mechanism 25 is in its winter position. This circuit is as follows: line wire 253, switch arm 28, contact 33, wire 254, primary 252 and wire 255 to ground 256. Therefore, assuming that winter operation is taking place as has been assumed above in this part of the description, the engagement of switch arm 247 with contact 249 causes energization of energizing coil 233 by a circuit as follows: secondary 251, wire 257, wire 258, wire 259, energizing coil 233, wire 260, switch arm 247, contact 249, wire 261, wire 262 and wire 263 to the other side of secondary 251. Energization of this energizing coil 233 moves switch arms 236 and 237 into engagement with their cooperating contacts 238 and 239. Engagement of switch arm 237 with contact 239 energizes the solenoid water valve 231 as previously described. Engagement of switch arm 236 with contact 238 establishes a holding circuit for energizing coil 233 which is entirely independent of switch arm 247 and contact 249. This holding circuit is as follows: secondary 251, wire 257, wire 258, wire 259, energizing coil 233, wire 264, contact 238, switch arm 236, wire 262, and wire 263 to the other side of secondary 251. Therefore, the energizing coil 233 remains energized even though the switch arm 247 disengages contact 249. Now, whenever switch arm 247 engages contact 250, a circuit for the bucking coil 234 is established as follows: secondary 251, wire 257, wire 258, wire 265, bucking coil 234, wire 266, contact 250, switch arm 247, wire 260, wire 264, contact 238, switch arm 236, wire 262, and wire 263 to the other side of secondary 251. The magnetic effect produced by bucking coil 234 neutralizes the magnetic effect produced by energizing coil 233, whereupon armature 235 is free to move to its normal biased position wherein switch arms 236 and 237 are disengaged from their respective contacts 238 and 239. The solenoid water valve 231 is thereupon deenergized. Disengagement of switch arm 236 from contact 238 not only interrupts the holding circuit for the energizing coil 233 but also interrupts the circuit for bucking coil 234 so that both of these coils are now deenergized and the parts remain in the positions shown. Armature 235 will now remain in its biased position until switch arm 247 again engages contact 249 whereupon the above described operation will be repeated. As a result, solenoid water valve 231 is opened whenever switch arm 247 engages contact 249 and is maintained open until switch arm 247 subsequently engages contact 250.

The solenoid coils 244 and 245, in series, are connected across secondary 251. This circuit is as follows: secondary 251, wire 257, wire 267, wire 268, solenoid coil 244, solenoid coil 245, wire 269, wire 270 and wire 263 to the other side of secondary 251. Variations in the energizations of the respective solenoid coils 244 and 245 are adapted to be produced primarily by a potentiometer controller that is actuated in response to relative humidity changes in the room or space. This humidity responsive potentiometer controller comprises a bell crank which is pivoted at 270 and includes an arm 271. This arm 271 is connected to a humidity responsive element 272 which is herein shown as comprised by a plurality of strands of hair. The other end of this element 272 is secured as indicated at 273. A coiled tension spring 274 operates to maintain element 272 under proper tension at all times. The bell crank is provided with a second arm 275 which takes the form of a control contact that cooperates with a control resistance 276. The arrangement is such that the control contact 275 completely traverses the control resistance 276 upon a predetermined change in relative humidity which, for the purpose of the present explanation, has been selected as changes in humidity ranging from 20% to 40%. With the parts in the position shown, the relative humidity is 40% so that the control contact 275 is engaging the extreme right-hand end of control resistance 276. This control resistance 276 is connected in parallel with the series connected solenoid coils 244 and 245, the left end of control resistance 276 being connected to the lower end of solenoid coil 245 by wire 277 and wire 269, the right-hand end of this control resistance 276 being connected to the lower end of solenoid coil 244 by wire 278, wire 279, and wire 268. The control contact 275 is connected to the junction of solenoid coils 244 and 245 by wires 280 and 281.

With the parts in the position shown, except that assuming the change-over relay 25 is in its winter position, the secondary 251 is energized and the solenoid coil 244 is short circuited by the following circuit: from the junction of solenoid coils 244 and 245, wire 281, wire 280, control contact 275, wire 278, wire 279, and wire 268 to the lower end of solenoid coil 244. As a result, under these conditions, solenoid coil 245 will be more highly energized than solenoid coil 244 whereupon switch arm 247 is moved into engagement with contact 250. Under these conditions, the relay armature 235 of the relay mechanism 232 will be in the position shown in Fig. 3. Therefore, water valve 231 will be deenergized. If the relative humidity of the room or space should now begin to lower so that control contact finger 275 moves along the control resistance 276 towards its left-hand end, part of the resistance 276 will be placed in the shunt circuit for solenoid coil 244. Likewise, some of the resistance 276 will be removed from a shunt circuit for solenoid coil 245 which is as follows: from the junction of solenoid coils 244 and 245, wire 281, wire 280, control contact 275, control resistance 276, wire 277 and wire 269 to the lower end of solenoid coil 245. As a result, the difference in the energizations of solenoid coils 244 and 245 is reduced as the control contact 275 approaches the center of control resistance 276. When the control contact 275 has reached the center of control resistance 276, there will be equal amounts of resistance 276 in the shunt circuits for solenoid coils 244 and 245 whereupon they will be equally energized and the switch arm 247 will be disposed exactly intermediate the contacts 249 and 250. As the relative humidity continues to lower so that cotnrol contact 275 moves past the center of control resistance 276 while moving towards the left-hand end thereof, more than half of the control resistance 276 will be placed in parallel with the solenoid 244 and less than half thereof will be placed in parallel with the solenoid 245. The solenoid coil 244 thereupon becomes more highly energized than the solenoid coil 245 and, when this difference in energization is sufficient, switch arm 247 will engage contact 249 whereupon the water valve 231 will be energized through the relay mechanism 232 as previously described. Then, if the relative humidity rises to again equalize the energizations of solenoid coils 244 and 245, or to reduce the difference between such energizations, the switch arm 247 will disengage the contact 249. However, the solenoid valve 231 remains energized by means of the holding circuit for the energizing coil 233 of the relay mechanism 232. Then, as the relative humidity continues to rise and goes above 30% so that the control contact finger 275 moves past the center of control resistance 276 and towards the right-hand end thereof, solenoid coil 245 becomes more highly energized than solenoid coil 244. When this difference in energizations has become sufficiently great, switch arm 247 engages the contact 250 to energize the bucking coil 234 of the relay mechanism 232 whereupon solenoid valve 231 is deenergized and the supply of water to the water spray 22 is discontinued. In this manner, the relative humidity responsive controller operates to turn on and off the water supply to water spray 22.

As pointed out above, the present invention includes means for varying the relative humidity that is maintained in the room or space upon fluctuations in outdoor temperature. For this purpose, an outdoor temperature responsive controller generally indicated at 285 is utilized. This controller includes a rotatable shaft 286 to which an arm 287 is secured. This arm is operated by a pressure responsive device 288 in the form of a bellows which is connected to a controlling bulb 289 by means of a connecting tube 290. The bellows 288, controlling bulb 289, and connecting tube 290 are charged with a suitable amount of volatile or expansible fluid whereby the pressure in bellows 288 increases upon temperature rise. The action of the bellows 288 is opposed by a suitable tension spring 291 in the usual manner. The bulb 289 responds to outdoor temperature and may be conveniently located in the fresh air intake duct 11. The shaft 286 supports a pair of control contacts 292 and 293. The control contact 292 cooperates with a control resistance 294 for a purpose to be hereinafter set out, and control contact 293 cooperates with a similar control resistance 295. The arrangement is such that the control contacts 292 and 293 completely traverse resistance 294 and 295 upon forty degrees change in outdoor temperature, the range in this particular embodiment of the invention being from 0° F. to 40° F. Inasmuch as the outdoor temperature will often rise above 40° F., the control contacts 292 and 293 are arranged to ride upon conductive sleeves 296 and 297 after they have completely traversed the control resistances 294 and 295 upon temperature rise.

The control resistance 295 is connected in parallel with the control resistance 276, the left-hand end of both of these resistances being inter-connected by a wire 298 and the right-hand ends thereof being inter-connected by wire 278 and a wire 299. The control contact 293 is connected to the junction of wires 280 and 281 by a wire 300. When the control contact 293 is engaging the center of the associated control resistance 295, that is at 20° F. outdoor temperature, then the humidity controller will operate to maintain the relative humidity of the space at about 30%, since it will also control from the center of control resistance 276. However, if the outdoor temperature rises somewhat, say to 30° F., then more of the control resistance 295 will be in parallel with the solenoid coil 244 than is in parallel with the solenoid coil 245, so that a balanced condition will only exist when the humidity control contact 275 is disposed to the right of its central position so as to place less of the control resistance 276 in parallel with the solenoid coil 244 than is in parallel with solenoid coil 245. In this manner, as the outdoor temperature rises, a higher degree of average relative humidity is maintained in the room or space, and as the outdoor temperature falls, a lower degree of average relative humidity is maintained therein. By this arrangement, as the outdoor temperature lowers, the relative humidity in this space is maintained at lower and lower values so that the dew point temperature of the air in the space is always kept below the temperature of the windows and the exposed walls whereby to prevent the condensation of moisture thereon.

Since the relative humidity is thus allowed to fluctuate upon changes in outdoor temperature, although the dry bulb temperature is maintained constant by the apparatus hereinbefore described, such fluctuations in relative humidity will cause fluctuations in the effective temperatures of the space. The present invention, therefore, contemplates adjusting the dry bulb temperature in the space in accordance with the fluctuations in the relative humidity so as to maintain the effective temperature substantially constant at all times. In order to accomplish this result, the control potentiometer comprised by the control contact 292 and the control resistance 294 is associated with the indoor temperature controller comprised by the control contact 109 and the control resistance 113. It will be noted that the right-hand end of the control resistance 294 is connected to the right-hand end of solenoid coil 194 by being connected to the wire 213, by a wire 305. Similarly, the left-hand end of control resistance 294 is connected to the left-hand end of solenoid 193 by being connected to the junction of wires 216 and 217 by a wire 306. The control resistance 294 is therefore connected in parallel, through protective resistances 210 and 211, with the series-connected solenoid coils 193 and 194. The control contact 292 is connected to the junction of solenoid coils 193 and 194 by being connected to the junction of wires 226 and 227 by a wire 307. As a result, when the outdoor temperature is at a value of 20° F. so that the control contact 292 is engaging the center of control resistance 294, then half of this control resistance is in parallel with the solenoid coil 193 and half of it is in parallel with solenoid coil 194. Under these conditions, the control resistance 294 and its associated control contact 292 has no effect upon the position the main operating shaft 178 will assume under the influence of the controller comprised by control resistance 113 and its associated control 109. However, if the outdoor temperature should rise to 30° F. so that a higher relative humidity is thereupon maintained in the space as heretofore set out, then less of the resistance 294 is placed in parallel with the solenoid coil 193 so that the current thereto increases and the balancing contact finger 221 must move further towards the lower end of balancing resistance 220 before the energizations of the solenoid coils 193 and 194 are again balanced. As a result, the steam valve is closed down somewhat so that a lower space temperature is maintained. This lowered space temperature taken together with the higher space relative humidity maintains the effective temperature of the space constant or substantially so. The opposite action takes place upon a decrease in the outdoor temperature so the final result is that the relative humidity maintained in the space is varied upon changes in outdoor temperature but the dry bulb temperature of the space is thereupon varied so as to maintain the effective temperature in the space constant at all times. This control therefore provides for a comfortable control of the space at all times while retaining the relative humidity at the safe value.

With the parts in the position shown as in Fig. 3, the change-over relay 25 is energized and the apparatus is operating on a summer cycle. Under these conditions, the transformer secondary 251 is deenergized since switch arm 28 is disengaged from contact 33. As a result, neither of the solenoid coils 244 or 245 is energized and the contact arm 247 is intermediate contacts 249 and 250 as shown. Also, irrespective of the last operation of the relay mechanism 232, both the energizing coil 233 and the bucking coil 234 are now deenergized so that the switch arm 237 is disengaged from its cooperating contact 239 and the solenoid water valve 231 is deenergized. Furthermore, the control contacts 292 and 109 are disconnected from the junction of solenoid coils 193 and 194 since switch arm 31 is disengaged from contact 38. Likewise, the left-hand end of the control resistances 113 and 294 are disconnected from the left-hand end of solenoid 193 since switch arm 32 is disengaged from contact 40. Also, the solenoid 193 is substantially short-circuited by a shunt circuit which is as follows: from the junction of coils 193 and 194, wire 225, wire 228, switch arm 31, contact 39, wire 310, switch arm 311, a cooperating contact 312, wire 313, contact 41, switch arm 32, wire 218, wire 219 and protective resistance 211 to the left-hand end of solenoid coil 193. As a result, balancing contact finger 221 is in the position shown wherein the solenoid coil 194 is substantially short-circuited by the circuit as traced above. Under these conditions, the steam valve 176 is closed, as will be evident, and, of course, this is the proper position for the steam valve during the summer operation.

*Cooling and dehumidifying control*

Referring to Fig. 1, the dehumidifying coil 19 and the cooling coil 20 may be supplied with any suitable type of cooling or refrigerating medium and are herein shown as being supplied with liquid refrigerant by means of a mechanical refrigeration system that includes a compressor 315 and a condenser 316. The compressor 315 is driven by a compressor motor 317. The flow of the liquid refrigerant from the condenser 316 to the cooling coil 20 is controlled entirely by an expansion valve 318 but the flow of liquid refrigerant from the condenser 316 to the dehumidifying coil 19 is controlled not only by an expansion valve 319 but is also controlled by a solenoid valve 320. As a result, whenever liquid refrigerant is available, it may flow to the cooling coil 20 under the control of its expansion valve 318 but it can only flow to the dehumidifying coil 19 under the control of the expansion valve 319 in the event the solenoid refrigerant valve 320 is open. Energization of the compressor motor 317 is controlled by the summer-winter change-over relay 25 and in part by a relay mechanism 321. This relay mechanism 321 includes an energizing coil 322, a bucking coil or neutralizing coil 323 and an armature 324. The armature controls a pair of switch arms 325 and 326 which cooperate with contacts 327 and 328. Whenever the switch arm 326 engages the contact 328, and provided the change-over relay 25 is in summer position, as shown, so that its switch arm 28 is engaging contact 34, the compressor motor is energized by the following circuit: line wire 253, switch arm 28, contact 34, wire 329, wire 330, wire 331, contact 328, switch arm 326, wire 332, wire 359, compressor motor 317, and wire 333 to ground 256.

The relay mechanism 321 is controlled by a relay mechanism 335 that includes a pair of oppositely acting solenoid coils 336 and 337 that cooperate in the control of a single armature 338 that is pivoted at 339. The armature 338 controls a switch arm 340 through a piece of insulation 341 and this switch arm 340 cooperates with a pair of spaced contacts 342 and 343. Whenever the switch arm 340 engages the contact 342, energizing coil 322 of relay mechanism 321 is energized, provided power is available. Power is furnished by the low voltage secondary 344 of a transformer having a high voltage primary 345 which is energized whenever the change-over relay 25 is in summer position. This energizing circuit for primary 345 is as follows: line wire 253, switch arm 28, contact 34, wire 329, wire 346, primary 345 and wire 347 to ground 256. Therefore, assuming switch arm 340 engages contact 342, energizing coil 322 is energized as follows: secondary 344, wire 348, wire 349, energizing coil 322, wire 350, switch arm 340, contact 342, wire 351, wire 334 and wire 352 to the other side of secondary 344. Energization of the energizing coil 322 attracts the armature 324 and causes switch arms 325 and 326 to be moved into engagement with their respective contacts 327 and 328. Engagement of switch arm 326 with contact 328 energizes the compressor motor 317 by the circuit set forth above. The engagement of switch arm 325 with contact 327 establishes a holding circuit for energizing coil 322 which is entirely independent of the switch arm 340 and the contact 342, this holding circuit being as follows: secondary 344, wire 348, wire 349, energizing coil 322, contact 327, swtich arm 325, wire 353 and wire 352 to the other side of secondary 344. Energizing coil 322 will now remain energized if switch arm 340 disengages contact 342. However, whenever switch arm 340 engages contact 343, the bucking coil 323 will be energized by a circuit which is as follows: secondary 344, wire 348, wire 354, bucking coil 323, wire 355, contact 343, switch arm 340, wire 350, contact 327, switch arm 325, wire 353 and wire 352 to the other side of secondary 344. The magnetic effect produced by the bucking coil 323 neutralizes that produced by the energizing coil 322 whereupon the armature 324 returns to the position shown wherein switch arms 325 and 326 are disengaged from contacts 327 and 328. Disengagement of switch arm 326 from contact 328 deenergizes compressor motor 317. Disengagement of switch arm 325 from contact 327 interrupts the holding circuit for energizing coil 322 as well as the circuit for bucking coil 323 whereby neither of these coils is longer energized. The armature 324 will therefore remain in the position shown until switch arm 340 again engages contact 342.

The respective energizations of solenoid coils 336 and 337 of the relay mechanism 335, and therefore the energization and deenergization of the compressor motor 317, are controlled by the cooperative action of a space dry bulb temperature responsive device, a space relative humidity responsive device, and an outdoor dry bulb temperature responsive device. The arrangement is such that the indoor relative humidity responsive device and the space dry bulb temperature responsive device cooperate in such a manner as to maintain the effective temperature of the space within the comfort zone. The outdoor temperature controller operates to raise this effective temperature as the outdoor temperature rises, the arrangement being such that the inside effective temperature is raised at a slower rate than the outdoor temperature rises.

The inside temperature responsive controller is generally indicated at 360 and comprises a bell crank that is pivoted at 361 and includes an arm 362 that is positioned by a pressure responsive member herein shown as a bellows 363. This bellows is connected to a suitable control bulb 364 by means of a connecting tube 365. The bellows 363, the control bulb 364 and the tube 365 are charged with a suitable amount of volatile or expansible fluid whereby the pressure in bellows 363 is increased upon temperature rise. The pressure in the bellows 363 is opposed by a coiled tension spring 366 in the usual manner. The bell crank which is pivoted at 361 includes a second arm 367 which takes the form of a control contact that cooperates with a control resistance 368. In this particular embodiment of the invention, the arrangement is such that the control contact 367 traverses the control resistance 368 upon temperature changes ranging from 70° F. to 82° F. As noted above, this controller responds to the space temperature and its controlling bulb 364 may be conveniently placed in the return air duct 12.

The relative humidity responsive controller is indicated generally at 370 and comprises a bell crank pivoted at 371 which includes an arm 372 that is secured to one end of a humidity responsive element 373. This humidity responsive element may take any desired form and is herein shown as comprising a plurality of strands of hair. The other end of element 373 is suitably secured as indicated at 374. A coiled tension spring 375 serves to keep the humidity responsive element 373 at the proper tension. This bell crank includes a further arm 376 which takes the form of a control contact that cooperates with a control resistance 377. The arrangement is such that the control contact 376 sweeps across the control resistance 377 upon changes in relative humidity ranging from 30% to 60% and, in accordance with the disclosures of the other figures of the drawings, this controller is shown in the position it assumes when the prevailing relative humidity is substantially 40%.

The outdoor temperature responsive controller is generally indicated at 380 and comprises a rotatable shaft 381 to which an arm 382 is secured. This arm 382 is positioned by a pressure responsive device in the form of a bellows 383 that is controlled by a control bulb 384 to which it is connected by means of a tube 385. The bellows 383, control bulb 384 and the tube 385 are charged with suitable volatile or expansible fluid so that the pressure in the bellows 383 increases upon temperature rise. In order to make this apparatus respond to outdoor temperature, the bulb 384 may be located in any convenient place and is herein shown as located in fresh air inlet 11. The pressure in the bellows 383 is opposed by a suitable coiled spring 386 in the usual manner. The shaft 381 supports three control contacts 387, 388 and 389. These three control contacts 387, 388 and 389, respectively, cooperate with three compensating resistances 390, 391 and 392. The arrangement is such that each of these control contacts completely traverses its associated resistance upon changes in outdoor temperatures, ranging from 75° F. to 100° F.

The solenoid coils 336 and 337, in series, are connected across the secondary 344 by the following circuit: secondary 344, wire 395, wire 396, solenoid coil 336, solenoid coil 337, wire 397, wire 334, and wire 352 to the other side of secondary 344. The control resistances 377 and 368, in parallel, are connected in parallel with the series-connected solenoid coils 336 and 337, through the respective resistances 390 and 392 by wires 396, wire 398, wire 399, wire 400, wire 401, wire 402, wire 403, wire 334, and wire 397. The control contacts 376 and 367 are connected to the center of resistance 391 by wires 404, 405 and 406. The control contact 388, that cooperates with the resistance 391 is connected to the junction of solenoid coils 336 and 337 by a wire 407.

With the parts in the position shown wherein the inside and outside temperatures are substantially 70° F., and the inside relative humidity is approximately 40%, the relay coil 337 is more highly energized than the relay coil 336 and switch arm 340 is engaging contact 343 so that relay mechanism 321 is deenergized and the compressor motor 317 is also deenergized and no cooling is taking place. In order to simplify the explanation of this particular phase of the system, let it be assumed that the outside temperature is half way between the range of controller 380 or is at approximately 87½° F., and that the relative humidity in the space is 45%. Under these conditions, none of the resistance 391 and one-half of each of the resistances 390 and 392 will be included in the various shunt circuits for relay coils 336 and 337 that will shortly be described. Also, under these assumed conditions, the contact arm 376 of the relative humidity responsive controller 370 is engaged with the mid-portion of its associated resistance 377. Also, assume that the space temperature is intermediate 70° F. and 82° F. or substantially 76° F. so that the contact 367 is engaging the center of its associated resistance 368.

Under these assumed conditions, it will be evident that relay coils 336 and 337 are equally energized. It will be noted that there is a shunt circuit for relay coil 336 that includes half of each of resistances 377 and 368 in parallel and includes half of resistance 390 in series therewith. This shunt circuit is as follows: from the junction of solenoid coils 336 and 337, wire 407, contact 388 and wire 406 whereupon the circuit branches, one portion going by way of wire 405, contact 367 and the left-hand portion of resistance 368 to wire 399, whereas the other branch of the circuit goes by way of wire 404, contact 376, the right-hand half of resistance 377, and wire 400 to wire 399, after which the circuit joins and goes through half of resistance 390, contact 387, wire 398 and wire 396 to the lower end of solenoid coil 336. There is a similar shunt circuit for solenoid coil 337 which includes half of each of the resistances 377 and 368 in parallel and half of resistance 392 in series therewith. This shunt circuit is as follows: from the junction of solenoid coils 336 and 337, wire 407, contact 388 and wire 406, whereupon the circuit branches part going by way of wire 405, contact 367 and the right-hand half of resistance 368 to wire 402, whereas the other portion goes by way of wire 404, contact 376, the left-hand half of resistance 377 and wire 401 to wire 402 after which the circuit traverses half of resistance 392, contact 389, wire 403, wire 334 and wire 397 to the lower end of solenoid coil 337. These solenoid coils 336 and 337 are therefore equally energized and the switch arm 340 will be disposed intermediate contacts 343 and 344. Assuming that switch arm 340 was last engaged with contact 343, then the relay mechanism 321 and compressor motor 317 will be deenergized.

Now if the temperature of the space should rise slightly so that the contact 367 moves along the associated control resistance 368 towards its right-hand end, more of resistance 368 will be placed in the shunt circuit for solenoid coil 336 and less of the resistance 368 will be contained in the shunt circuit for solenoid coil 337. As a result, more current flows through solenoid coil 336 and less through solenoid coil 337 so that switch arm 340 moves towards contact 342. When this rise in space temperature has been sufficient, switch arm 340 will engage contact 342 whereupon energizing coil 322 will be energized by the circuit described above. Switch arm 326 therefore engages contact 328 to energize compressor motor 317 by the previously described circuit whereupon refrigerant is delivered to the cooling coil 320 through the associated expansion valve 318. The air being delivered to the space will therefore begin to cool and contact 367 will move to the left along its associated control resistance 368.

Switch arm 340 will therefore disengage contact 342 but the energizing coil 322 will remain energized by the holding circuit set forth above. When the temperature of the space again reaches 76° F., switch arm 340 will be exactly intermediate contacts 342 and 343. Further drop in space temperature places less of resistance 368 in the shunt circuit for solenoid coil 336 and more of resistance 368 in the shunt circuit for solenoid coil 337 whereupon the energization of solenoid coil 336 decreases and deenergization of solenoid coil 337 increases. Switch arm 340 therefore moves closer to contact 343 and when this temperature drop has been sufficient, the switch arm 340 will engage contact 343. Engagement of these parts energizes the neutralizing coil 323 as previously explained and switch arm 326 disengages contact 328 to deenergize the compressor motor 317 to discontinue the refrigerating action as soon as the compressed refrigerant is used up.

It will thus be seen that for the assumed conditions of 87½° F., outdoor temperature and 45% relative humidity, the inside controller 360 will control the relay mechanism 335 to maintain the space temperature at substantially 76° F.

If the relative humidity should now fall to 40% as shown in Fig. 1 of the drawings, less of resistance 377 will be contained in the shunt circuit for solenoid coil 336 and more of this resistance will be contained in the solenoid coil 337. As a result, the energization of solenoid coil 336 will be reduced and that of solenoid coil 337 will be increased wherefor the space temperature must rise somewhat above 76° F. so as to bring more of resistance 368 in the shunt circuit for solenoid coil 336 and less resistance for the solenoid coil 337 in order to bring about a balanced energization of these solenoid coils. As a result, lowering of the relative humidity of the space shifts the control point of the controller 360 so that a higher space temperature will be maintained. On the other hand, an increase in the space relative humidity causes the opposite action by placing less of the resistance 377 in the shunt circuit for solenoid coil 336 and more of this resistance in the shunt circuit for solenoid coil 337. It will thus be seen that a decrease in relative humidity causes a higher space temperature to be maintained and an increase in relative humidity causes a lower temperature to be maintained wherefor the effective temperature of the space is maintained constant or within desired limits.

In a similar manner, if the outdoor temperature should fall below 87½° F., more of the resistance 390 will be placed in the shunt circuit for solenoid coil 336 and less of resistance 392 will be contained in the shunt circuit for solenoid coil 337. The solenoid coil 336 therefore becomes more highly energized and the energization of solenoid coil 337 is reduced. The space temperature must therefore fall to a lower degree so as to remove part of the resistance 368 from the shunt circuit of solenoid coil 336 and place more of this resistance in the shunt circuit for solenoid coil 337 in order to again equalize the energizations of these solenoid coils. As a result, a lowering of outside temperature shifts the control point of the controller 360 so that a lower space temperature is maintained. The opposite action takes place upon an increase in the outside temperature so that a higher space temperature is maintained.

The values of the resistances as well as the ranges of these various controllers is preferably such that the effective temperature maintained in the space by the cooperative action of the controllers 360 and 370 is raised at a slower rate than the outdoor temperature rises so that a variable differential is maintained between the inside effective temperature and outdoor dry bulb temperature.

In the event the relative humidity should reach 60%, a pair of switch arms 410 and 411 are sequentially moved into engagement with a pair of cooperating contacts 412 and 413. The arrangement is such that switch arm 410 first engages contact 412 and then switch arm 411 engages contact 413. These switch arms and contacts control a relay generally indicated at 415 which in turn controls the refrigerant solenoid valve 320. This relay mechanism 415 comprises a relay coil 416 and a cooperating armature 417. The armature 417 controls the switch arm 811, hereinbefore mentioned, and also controls switch arms 418 and 419. Switch arm 418 cooperates with contacts 357 and 420 and switch arm 419 cooperates with a contact 421. Switch arm 418 and its cooperating contacts 357 and 420 control circuits through the compressor motor 317 and the solenoid refrigerant valve 320. The circuit for compressor motor 317 is as follows: line wire 253, switch arm 28, contact 34, wire 329, wire 330, wire 422, wire 423, contact 420, switch arm 418, contact 357, wire 358, wire 359, compressor motor 317 and wire 333 to ground 256. The circuit for solenoid valve 320 is as follows: line wire 253, switch arm 28, contact 34, wire 324, wire 330, wire 422, wire 423, contact 420, switch arm 418, wire 424, solenoid valve 320 and wire 425 to ground 256. It will be noted that these circuits can be completed only when the change-over relay 25 is in its summer position. Power is supplied to the relay coil 416 by the secondary 426 of a step-down transformer that has a primary 427. Energization of this transformer is also controlled by the change-over relay 25 and the circuit for the primary 27 is as follows: line wire 253, switch arm 28, contact 34, wire 329, wire 330, wire 422, wire 428, primary 427 and wire 429 to ground 256.

Now when the relative humidity of the space rises to 60% or thereabove, so as to sequentially bring contact arms 410 and 411 into engagement with cooperating contacts 412 and 413, relay coil 416 is energized as follows: secondary 426, wire 430, contact 412, contact arm 410, contact arm 411, contact 413, wire 431, relay coil 416 and wire 432 to the other side of secondary 426. Energization of relay coil 416 moves switch arm 311 into engagement with contact 433 (for a purpose which will appear hereinafter), moves switch arm 418 into engagement with contacts 420 and 357, and moves switch arm 419 into engagement with contact 421. Engagement of switch arm 418 with contacts 420 and 357 opens the dehumidifying solenoid valve 320 and energizes compressor motor 317. Movement of switch arm 419 into engagement with contact 421 establishes a holding circuit for relay coil 416 which is independent of the contact arm 411 and contact 413 and this holding circuit is as follows: secondary 426, wire 430, contact 412, contact arm 410, wire 434, contact 421, switch arm 419, relay coil 416 and wire 432 to the other side of secondary 426. The relay coil 416 will therefore remain energized until the relative humidity drops sufficiently not only to disengage contact arm 411 from contact 413 but also to disengage contact arm 410 from contact 412. The resulting flow of refrigerant to the dehumidifying coil 19 causes the air passing thereover to be cooled below its dew point whereby moisture is removed therefrom. This may be accomplished by design of the coil 19 or through the setting of the expansion valve 319. While refrigerant will also flow to cooling coil 20, this will have no particular effect since the temperature is not as low as the temperature of the dehumidifying coil.

It is possible that this dehumidifying action might result in the lowering of the space temperature below some permissible minimum such as 65° F. If this occurs, provision is made for opening the steam valve 176 whereby to raise the temperature of the air being delivered to the space. Even though the space temperature is not lowered below a desirable point, the temperature of the air discharged into the space may be so lowered that a cold draft results. The present invention contemplates the opening of the steam valve 176 not by the temperature of the space but by the temperature of the air being discharged into the space.

Referring again to Fig. 3, an indoor controller is generally indicated at 440. This controller comprises a bell crank that is pivoted at 441 and includes an arm 442 which is positioned by a pressure device in the form of a bellows 443. This bellows 443 is connected with controlling bulb 444 by a connecting tube 445. The bellows 443, controlling bulb 444, and connecting tube 445 are charged with a suitable volatile or expansible fluid whereby the pressure in bellows 443 is increased upon temperature rise. Controlling bulb 444 is located in the discharge from the air conditioning chamber 10 so as to respond to the temperature of the air discharged therefrom. The pressure in bellows 443 is opposed, in the usual manner, by a coiled spring 446. This bell crank includes a further arm 447 which takes the form of a control contact that cooperates with a control resistance 448. The arrangement is such that the control contact 447 engages the extreme left-hand end of the control resistance 448 when the discharge temperature falls to 65° F. The control contact 447 traverses this resistance 448 as the temperature continues to fall and reaches the extreme right-hand end thereof when the discharged air temperature reaches 60° F. It will be noted that the left-hand end of control resistance 448 is connected to the left-hand end of solenoid coil 193 by wire 449, wire 219 and protective resistance 211, whereas the right-hand end of control resistance 448 is connected to the right-hand end of solenoid coil 194 by wire 450, wire 213, protective resistance 210, wire 212 and wire 208. The control resistance 448 is therefore connected in parallel with the series-connected solenoid coils 193 and 194, through the protective resistances 210 and 211. The control contact 447 is connected to contact 433 by wire 451. As a result, when the change-over relay 25 is in its summer position, as shown, and, when the relay coil 416 is energized by reason of excessive humidity conditions as just described above, the control contact 447 is connected to the junction of solenoid coils 193 and 194 by wire 451, contact 433, switch arm 311, wire 310, contact 39, switch arm 31, wire 228 and wire 225. Therefore, whenever the relative humidity becomes excessive and energizes the relay coil 416, the control potentiometer 448 is placed in control of motor mechanism 467 that controls the steam valve 176. So long as the discharge air temperature remains at or above 65° F., control contact finger 447 engages the wire 449 so that the solenoid coil 193 is substantially short-circuited by the following circuit: from the junction of solenoid coils 193 and 194, wire 225, wire 228, switch arm 31, contact 39, wire 310, switch arm 311, contact 433, wire 451, wire 449, wire 219, and protective resistance 211 to the left-hand end of solenoid coil 193. The steam valve 176 therefore remains closed. However, should the discharged air temperature fall below 65° F., part of the control resistance 448 is placed in this shunt circuit so that the solenoid coil 193 receives more current and the steam valve 176 must move partly open in order for balancing contact 221 to move upwardly along balancing resistance 220 to rebalance the energizations of the solenoid coils 193 and 194. In this manner, as the discharge temperature falls, the steam valve is opened more and more widely and if the discharge air temperature falls to 60° F. so that control contact 447 engages wire 450, then the steam valve 176 is moved to its full open position. This opening of the steam valve reheats the air which is being discharged from the air conditioning chamber and prevents the discharge of unduly cold air into the space so as to prevent the formation of unpleasant drafts and prevents the ultimate lowering of the space temperature below the desired value.

Summary

To summarize the operation of the system of the present invention, the change-over from summer control to winter control and vice versa is accomplished by means responsive both to the temperature of the space to be controlled and to the outdoor temperature so that the apparatus operates on a summer cycle if either of these temperatures is sufficiently high and can only operate on a winter cycle when both of these temperatures are below predetermined values. With the parts in the position shown in the drawings, the apparatus is operating on a summer cycle. Under these conditions, the cooling means is operated under the control of a space relative humidity responsive device and a space dry bulb temperature responsive device in such manner as to maintain a desired or constant effective temperature. However, the effective temperature that is maintained in the space is raised as the outdoor temperature rises, but at a slower rate, whereby a variable differential is maintained between the outdoor temperature and the indoor effective temperature. Under normal conditions of operation, no attempt is made to control the relative humidity in the summer cycle since the removal of moisture requires a larger cooling capacity than does mere cooling. However, if the relative humidity should become excessive, then a dehumidifying action takes place. If this dehumidifying of the air passing through the air conditioning chamber results in the discharged air temperature being lowered below a desired minimum value, then a discharged air temperature thermostat operates the winter steam valve so as to reheat the air being discharged into the space. During the summer operation, the damper in control of the taking in of fresh air is operated from a full open position to a closed position when the outdoor temperature either rises above or falls below some optimum value such as 70° F. However, provision is made for preventing the complete closure of this fresh air damper upon a rise in outdoor temperature if it be desired to always maintain a small amount of fresh air flow into the space. But if this small amount of fresh air flow is maintained, provision is further made to prevent this small flow of fresh air upon the outdoor temperature becoming excessive.

In the winter cycle, a control responsive to the relative humidity in the space controls the flow of water to the water spray for humidifying purposes. This humidity responsive control has its setting or adjustment lowered as the outdoor temperature falls whereby the dew point of the air in the space is maintained below the temperature of the windows and other exposed surfaces whereby to prevent the condensation of moisture thereon. A space temperature responsive dry bulb thermostat controls the application of heat to the space and the adjustment of this thermostat is raised as the outdoor temperature lowers in order to compensate for the lowering in the relative humidity maintained in the space whereby to maintain a constant effective temperature in the space at all times. During the winter operation, the fresh air damper is normally maintained opened only a small amount but may be completely opened under the control of a space temperature responsive thermostat if the space temperature should become excessive for any reason.

Provision is also made whereby the damper may be automatically moved under manual control to its full open position either during the winter cycle or the summer cycle for purposes of ventilation.

It will be readily appreciated that a great many changes in the various details of the present invention, as well as in the general combination can be made without departing from the spirit thereof. We therefore intend to be limited only by the scope of the appended claims.

We claim:

1. In an air conditioning system for conditioning a space, in combination, means to heat and cool said space, control means in control of said heating and cooling means, electrical means associated with said control means and operative to vary the control thereof upon said heating and cooling means, a pair of switches wired in parallel in control of said electrical means, means responsive to a space condition in control of one of said switches, and means responsive to an external condition in control of the other of said switches.

2. A year around air conditioning system of the class described, comprising, in combination, means for cooling air delivered to a space to a value above its dew-point, means responsive to the effective temperature of the space in control of said cooling means to maintain the effective temperature of the space substantially constant, means to cool the air delivered to the space to a value below its dew-point whereby to remove moisture therefrom, means responsive to the moisture of the air in the space in control of said last-named cooling means and operative to cause moisture to be removed from the air being delivered to the space only in the event the moisture content of the air in the space becomes excessive, heating means for heating the air being supplied to the space, a delivered air temperature responsive thermostat in control of said heating means to prevent lowering of the delivered air temperature below a predetermined value by reason of its being cooled below its dew-point, means in control of said heating means for winter operation, and means to selectively place said last-named means in control of the heating means or to place all of said other controls in control of the space conditioning means.

3. In an air conditioning system, in combination, means to cool air to be delivered to a space to a value above its dew-point, means responsive to the effective temperature of the space in control of said cooling means to maintain the space effective temperature substantially constant, means to cool the air being supplied to the space to a value below its dew-point to cause the removal of moisture therefrom, means responsive to the moisture content of the air in said space in control of said last named cooling means and operative to cause the removal of moisture from the air being supplied to the space only when the space moisture content becomes excessive, means to heat the space, means responsive to the temperature of the space in control of said heating means, means responsive to the temperature of the air being supplied to the space for additionally controlling said heating means, and means responsive to outdoor temperature to raise the value of the effective temperature maintained therein by said effective temperature responsive means as the outdoor temperature rises and to raise the value of the space temperature maintained therein by said space temperature responsive means as the outdoor temperature lowers.

4. In a control system for a space, means in control of the flow of fresh air to the space, means responsive to the space temperature to control said fresh air flow control means to increase the flow of fresh air to the space if the space temperature becomes higher than desired, means responsive to the outdoor temperature to control the flow of fresh air to said space, and means responsive to outdoor temperature to selectively place said space temperature or outdoor temperature responsive means in control of said fresh air flow control means.

5. In an air conditioning system in combination, damper means in control of the flow of fresh air to a space, means responsive to temperature conditions external to said space in control of said damper means to move the same from open position to closed position upon rise or fall of said temperature above or below an optimum value, means responsive to the temperature of said space in control of said damper means to move the same from closed position toward open position upon a rise in such temperature above a given value, and means selectively operable to place one or the other of said temperature responsive means in control of said damper means, said means including a space temperature responsive thermostat and an external temperature responsive thermostat.

6. In an air conditioning system, in combination, damper means in control of the flow of fresh air to a space, means responsive to temperature conditions external to said space in control of said damper means to move the same from open position to closed position upon rise or fall of said temperature above or below an optimum value, means responsive to the temperature of said space in control of said damper means to move the same from closed position toward open position upon a rise in such temperature above a given value, electrical means selectively operable to place one or the other of said temperature responsive means in control of said damper means, a pair of switches in control of said electrical means, and temperature responsive means in control of said switches.

7. In a heating and cooling system for a space, means to discharge air into said space, means to heat said air, means to cool said air, means responsive to a condition of the air in the space in control of said cooling means, means responsive to the temperature of the air discharged to said space to control said heating means, means responsive to the space temperature to control said heating means, and means responsive to outdoor temperature operable upon rise in outdoor temperature to place said condition responsive means in control of said cooling means and said discharge air temperature responsive means in control of said heating means and upon fall in outdoor temperature to place said space temperature responsive means in control of said heating means.

8. In a control system for a space, in combination, means to deliver air to the space, means to heat the air delivered to the space, means to reduce the relative humidity of the space by reducing the temperature of the air delivered thereto to abstract moisture therefrom, a summer control in control of said air temperature reducing means operative to prevent raising of the space relative humidity above a predetermined maximum, an air discharge temperature responsive device operative to control said heating means to prevent the discharging of air below a predetermined temperature, a space temperature responsive device in control of said heating means to maintain the space temperature above a predetermined minimum, and means to selectively place said summer control means in control of said air temperature reducing means and said discharge air temperature responsive device in control of said heating means, or said space temperature responsive device in control of said heating means.

9. In an all year air conditioning system for a space, in combination, means to heat the space, means to add moisture to the space, means to cool the space, means responsive to the effective temperature of the space in control of said cooling means operative to maintain the effective temperature of the space substantially constant in the summer, means responsive to the space temperature in control of the heating means to maintain the temperature of the space at a predetermined value in the winter, means responsive to the relative humidity of the space in control of said moisture adding means to maintain the relative humidity at a predetermined value in the winter, means responsive to the outdoor temperature for adjusting said temperature responsive means and said humidity responsive means in a manner to lower the relative humidity and raise the temperature of the space in the winter upon lowering of the outdoor temperature and means responsive to a condition indicative of a need for heating or cooling to selectively place said system on summer or winter operation.

10. In an all year air conditioning system for for a space, in combination, means to heat the space, means to add moisture to the space, means to cool the space, means responsive to the effective temperature of the space in control of said cooling means operative to maintain the effective temperature of the space substantially constant in the summer, means responsive to the space temperature in control of the heating means to maintain the temperature of the space at a predetermined value in the winter, means responsive to the relative humidity of the space in control of said moisture adding means to maintain the relative humidity at a predetermined value in the winter, outdoor temperature responsive means for adjusting said temperature responsive means and said humidity responsive means in a manner to increase the effective temperature maintained in the space during the summer as the outdoor temperature rises and to lower the relative humidity and raise the temperature of the space in the winter as the outdoor temperature lowers, and means responsive to a condition indicative of a need for heating or cooling to selectively place said system on summer or winter operation.

11. A combined cold and warm weather air conditioning system of the class described; comprising; in combination, a cold weather system comprising, heating means, a space temperature responsive controller in control of said heating means, moisture adding means, a space moisture responsive control in control of said moisture adding means, and means responsive to outdoor temperature to cause a decreased moisture content and an increased temperature to be maintained in said space as the outdoor temperature decreases; a warm weather system comprising, cooling means to cool said space, space effective temperature responsive means in control of said cooling means, means to cool the air entering the space sufficiently to remove the moisture therefrom, means responsive to the moisture content of the air in the space in control of said last-named cooling means, means responsive to the temperature of the air supplied to said space for controlling the heating means of the cold weather system to prevent lowering of such discharge temperature below a predetermined minimum; and means to selectively place either said cold weather system or said warm weather system in control of said space.

12. In a combined cold weather and warm weather air conditioning system; the combination with damper means in control of the flow of fresh air to a space, and heating, cooling, and moisture adding means for conditioning said air; of a cold weather control system including means responsive to the space temperature for controlling said heating means, means responsive to space relative humidity for controlling said moisture adding means, means responsive to outdoor temperature for decreasing the relative humidity value and for increasing the space temperature value maintained in said space as the outdoor temperature decreases, and means responsive to space temperature to move said fresh air damper towards open position as the space temperature rises above a predetermined value; a warm weather control system comprising means responsive to the effective temperature of said space for controlling said cooling means to maintain the space effective temperature substantially constant without removing any substantial amount of moisture from the air delivered to the space, means responsive to the relative humidity of the space for controlling the cooling means to reduce the temperature of the air delivered to the space sufficiently to condense moisture therefrom when the space relative humidity becomes excessive, means responsive to the temperature of the delivered air to control said heating means to maintain the temperature of the delivered air above a predetermined minimum when being so cooled by the relative humidity responsive means, means responsive to outdoor temperature to move said fresh air damper from open position towards closed position as the outdoor temperature rises above or falls below an optimum temperature, and means responsive to outdoor temperature to raise the effective temperature maintained in said space as the outdoor temperature rises; and means responsive to temperature operative selectively to place said cold weather control system or said warm weather control system in control of said air conditioning apparatus.

13. In an air conditioning system, in combination, a conditioning chamber, means for causing a flow of air through said conditioning chamber and to a space to be conditioned, means for supplying fresh air to said conditioning chamber, inside temperature responsive means, and outside temperature responsive means for placing said inside temperature responsive means in control of said fresh air supplying means when outside temperature falls to a predetermined value.

14. In a summer-winter air conditioning system, in combination, an air conditioning chamber, means for causing a flow of air through said chamber and to a space to be conditioned, cooling and dehumidifying means in said chamber, a heater located in said conditioning chamber downstream of said cooling and dehumidifying means for heating the air during winter operation and for reheating the cooled and dehumidified air during summer operation, thermostatic means for controlling said heater during winter operation of the system for operating said heater when heat for said space is demanded, means for placing said heater out of operation during summer operation of the system when dehumidification of the air is not required, and means including humidity responsive means for placing said heater under the control of another thermostatic means during summer operation of the system when dehumidification of the air is required, said other thermostatic means being arranged to operate said heating means when reheat is required to prevent overcooling of the space.

15. In a summer-winter air conditioning system, in combination, an air conditioning chamber, means for causing a flow of air through said chamber and to a space to be conditioned, heat absorbing means for cooling and dehumidifying the air flowing through said conditioning chamber, heating means in said conditioning chamber downstream of said cooling and dehumidifying means for heating the air during winter operation and for reheating the air when necessary during summer operation, thermostatic means for operating said heat absorbing means to obtain a cooling action when necessary, moisture responsive means for operating said heat absorbing means to obtain a dehumidifying action when necessary, thermostatic means for operating said heating means when heating is required, means for normally preventing operation of said heating means when said heat absorbing means is in operation, and means responsive to excessive humidity conditions for placing said heating means in operation under the control of said thermostatic means when the humidity in said space becomes excessive.

16. In a summer-winter air conditioning system, in combination, a conditioning chamber, means for causing a flow of air through said conditioning chamber and to a space to be conditioned, means for dehumidifying air passing through said chamber, means located in said conditioning chamber downstream of said dehumidifying means for heating the air, thermostatic means responsive to the temperature of the air downstream of said heating means, thermostatic means responsive to the temperature of the air in said space, and changeover means for selectively placing said first mentioned thermostatic means or said second mentioned thermostatic means in control of said heating means.

17. In a summer-winter air conditioning system, in combination, a conditioning chamber, means for causing a flow of air through said conditioning chamber and to a space to be conditioned, cooling means in said chamber, heating means in said chamber, thermostatic means responsive to the temperature of the conditioned air for controlling said heating means in a manner to prevent the temperature of the air leaving said chamber from falling below a predetermined value, and temperature responsive changeover means for placing said thermostatic means into or out of operation.

18. In a summer-winter air conditioning system, in combination, a conditioning chamber, means for causing a flow of air through said conditioning chamber and to a space to be conditioned, cooling and dehumidifying means in said chamber, heating means in said chamber, thermostatic means responsive to the temperature of the conditioned air for controlling said heating means in a manner to prevent the temperature of the air leaving said chamber from falling below a predetermined value, changeover means for placing said thermostatic means into or out of operation, and moisture responsive means for preventing operation of said heating means when under the control of said temperature responsive means except when dehumidification is required.

19. An air conditioning system of the class described for conditioning a space, comprising, in combination, condition changing means for conditioning said space, cooling control means for controlling said condition changing means when cooling is desired, heating control means for controlling said condition changing means when heating is desired, means responsive to a condition of the space which is indicative of the heating and cooling load in control of said heating and cooling control means, and selective means to selectively place one or the other of said control means in control of said condition changing means, said selective means including a device responsive to a condition in the space and a device responsive to a condition exterior to said space.

20. An air conditioning system of the class described, in combination, condition changing means including heating apparatus for heating the space and cooling apparatus for cooling the space, means responsive to a condition of the space air which is indicative of the heating and cooling load for controlling said heating apparatus and said cooling apparatus in a manner to vary the operation of said heating apparatus in accordance with the heating load on the system and to vary the operation of said cooling apparatus in accordance with the cooling load on the system, change-over means for additionally controlling said heating and cooling apparatus in a manner to selectively place said cooling apparatus out of operation while placing said heating apparatus under the control of said condition responsive means, or to place said cooling apparatus under the control of said condition responsive means, and means including an outside temperature influenced thermostat and a space temperature influenced thermostat for controlling said change-over means.

21. An air conditioning system of the class described comprising in combination, condition changing means for heating and cooling a space, cooling control means for varying the action of said condition changing means in accordance with the cooling load on the system, heating control means for varying the action of said condition changing means in accordance with the heating load on the system, means responsive to the temperature in said space in control of said heating and cooling control means, change-over means for selectively arranging said condition changing means for heating or cooling said space, and means including a space temperature influenced thermostat for controlling said change-over means in a manner to actuate said change-over means for cooling the space when space temperature rises above a predetermined value, and for heating the space when the space temperature falls below a predetermined value.

22. An air conditioning system of the class described, in combination, condition changing means including heating apparatus for heating the space and cooling apparatus for cooling the space, means responsive to a condition of the space air which is indicative of the heating and cooling load for controlling said heating apparatus and said cooling apparatus in a manner to vary the operation of said heating apparatus in accordance with the heating load on the system and to vary the operation of said cooling apparatus in accordance with the cooling load on the system, change-over means for additionally controlling said heating and cooling apparatus in a manner to selectively place said cooling apparatus out of operation while placing said heating apparatus under the condition responsive of said control means, or to place said cooling apparatus under the control of said condition responsive means, and means including a space temperature influenced thermostat for controlling said change-over means in a manner to actuate said change-over means for placing said cooling apparatus under the condition responsive of said control means when space temperature is above a predetermined value, and for placing said cooling apparatus out of operation and placing said heating apparatus under the control of said condition responsive means when space temperature falls below a predetermined value.

23. In an air conditioning system, in combination, means for heating a space, means for varying the moisture content of said space, an electrical controller for varying the output of said heating means, a variable resistance type space temperature influenced thermostat for controlling said heating means controller in a manner to maintain a predetermined standard of temperature within said space, an electrical controller for varying the action of said moisture content varying means, a variable resistance type control device for controlling said last mentioned controller in a manner to maintain a predetermined standard of relative humidity in said space, a first variable resistance connected into circuit with said heating means controller, a second variable resistance connected into circuit with said moisture content varying means controller, and means influenced by outside temperature for adjusting said first and second variable resistances.

24. In an air conditioning system, in combination, means for heating a space, means for varying the moisture content of said space, an electrical controller for varying the output of said heating means, a space temperature influenced thermostat for controlling said heating means controller in a manner to maintain a predetermined standard of temperature within said space, an electrical controller for varying the action of said moisture content varying means, a control device for controlling said last mentioned controller in a manner to maintain a predetermined standard of relative humidity in said space, a first variable resistance connected into circuit with said heating means controller, a second variable resistance connected into circuit with said moisture content varying means controller, and means influenced by outside temperature for simultaneously adjusting said variable resistances in a manner to lower the standard of relative humidity and to raise the standard of space temperature upon decrease in outside temperature.

25. In an air conditioning system, in combination, means for supplying fresh air to a space to be conditioned, flow control means for varying the flow of fresh air, means influenced by the temperature of the fresh air for controlling said flow control means in accordance with the temperature of the fresh air available, and means influenced by the temperature of the air in said space for placing said fresh air temperature influenced means into control of said flow control means when the space temperature rises to a predetermined value.

26. In an air conditioning system, in combination, means for heating a space to be conditioned, means for supplying fresh air to said space, flow control means for varying the volume of fresh air supplied to said space, heating control means for controlling the supply of heat to said space, outside temperature influenced means for controlling said flow control means for varying the supply of fresh air in accordance with variations in temperature of the fresh air available, inside temperature influenced means for controlling said heating control means in a manner to place said heating control means out of operation when the space temperature rises above a predetermined value, and means influenced by space temperature for placing said outside temperature influenced means in control of said flow control means when the space temperature rises to a value above said first mentioned predetermined value.

27. In a summer-winter air conditioning system, in combination, an air conditioning chamber, means for causing a flow of air through said chamber and through a space to be conditioned, heat absorbing means for removing heat from the air passing through said chamber and into the space being conditioned, heating means in said conditioning chamber down-stream of said heat absorbing means for heating the air during winter operation and for reheating the air when necessary during summer operation, a first thermostatic means in control of said heating means, a second thermostatic means in control of said heating means, means responsive to a rise in outdoor temperature to a predetermined value for placing the heat absorbing means in condition for operation, means for placing the heating means under the control of the first thermostatic means when the heat absorbing means is not in condition for operation to maintain the temperature of the space above a predetermined low value, and means for placing the heating means under the control of the second thermostatic means when the heat absorbing means is placed in condition for operation to provide reheat for the heat absorbing means when desirable.

28. In a summer-winter air conditioning system, in combination, a conditioning chamber, means for causing flow of air through said conditioning chamber and to a space to be conditioned, cooling and dehumidifying means in said conditioning chamber, compressor means for circulating a refrigerant through said cooling and dehumidifying means, heating means in said conditioning chamber for reheating the air during summer operation and for heating the air during winter operation of the system, temperature responsive means for initiating operation of the compressor in response to a demand for sensible cooling in the space, humidity responsive means for initiating operation of the compressor in response to a rise in humidity above a predetermined value, space temperature responsive means for controlling said heating means in a manner to prevent the space temperature from falling below a predetermined minimum value, and means responsive to the temperature of the air leaving the conditioning chamber for controlling said heating means in a manner to prevent the temperature of the air being discharged to said space from falling below a predetermined value.

29. In an air conditioning system, electrically controlled cooling means, circuit connections for controlling operation of the cooling means, said circuit connections including a relay which permits operation thereof when said relay is moved to one position, temperature responsive means to move said relay to said one position when the temperature to which the temperature responsive means responds rises sufficiently, humidifying means, a humidity responsive switch in control thereof, and a switch closed by said relay when not in said one position to permit control of said humidifying means by said humidity responsive switch.

30. In a summer-winter air conditioning system, in combination, an air conditioning chamber, means for causing a flow of air through said chamber to a space to be conditioned, heat absorbing means for removing heat from the air passing through said chamber, heating means for heating the air in said space during winter operation of the system and for providing reheat when necessary during summer operation, a first thermostatic means for controlling said heating means and operative to vary the output of said heating means over a predetermined range upon temperature change of predetermined differential, a second thermostatic means for controlling said heating means and operative to vary the output of said heating means over said predetermined range upon a differential in temperature which is smaller than said first differential, control means for selectively placing said heat absorbing means in condition for operation or for rendering said heat absorbing means inoperative, and means for placing said heating means under the control of said first thermostatic means when said heat absorbing means is placed in condition for operation, while placing said heating means under the control of said second thermostatic means when said heat absorbing means is rendered inoperative.

31. In a summer-winter air conditioning system, in combination, conditioning means for heating or cooling a conditioned space, a first thermostatic means responsive to the temperature of said space for placing said conditioning means into operation for heating the space upon fall in temperature to a predetermined first value, a second thermostatic means responsive to the temperature of the space for placing said conditioning means into operation for cooling the space upon rise in temperature above a predetermined second value which is higher than said first value, and a third thermostatic means responsive to the temperature of said space and operative at a third temperature value which is between said first and second values to place said first thermostatic means in control of said conditioning means when space temperature falls below said third value, while placing said second thermostatic means in control of said conditioning means when space temperature rises above said third value.

32. In a summer-winter air conditioning system, in combination, conditioning means for heating or cooling a conditioned space, electrical control means for said conditioning means, a first thermostatic current controlling means responding to space temperature for placing said conditioning means into operation for heating the space when space temperature falls below a first value, a second thermostatic current controlling means responding to space temperature for placing said conditioning means into operation for cooling the space when space temperature rises above a second value which is higher than said first value, electrical connections between said first and second thermostatic current controlling means and said electrical control means, switching means interposed in said electrical connections for placing one or the other of said thermostatic current controlling means out of control, and a thermostat responding to space temperature at a value between said first and second values for controlling said switching means.

33. In a system of the class described, in combination, heating means for heating a space, means for supplying fresh air to the space, flow control means for controlling the volume of fresh air supplied, a first motor for controlling said heating means, a second motor for controlling said flow control means, a thermostat influenced by the temperature of the fresh air for controlling said second motor to thereby vary the flow of fresh air in accordance with the temperature at said thermostat, and thermostatic means for controlling said first and second motors, said thermostatic means acting to render said heating means inoperative for heating the space and to place said second motor under the control of said thermostat when space temperature rises above a predetermined value, while rendering said heating means operative for heating the space and placing said thermostat out of control of said second motor when space temperature falls below a predetermined value.

34. In an air conditioning system, in combination, a conditioning chamber, a cooling means, a dehumidifying means and a means for reheating air in said conditioning chamber, moisture responsive means for controlling dehumidification by said first means, and means controlled by the moisture responsive means for preventing operation of said reheating means when dehumidification is not required.

35. An air conditioning system of the class described comprising, in combination, condition changing means for heating and cooling a space, cooling control means for controlling the action of said condition changing means to lower the space temperature when the space temperature becomes too high, heating control means for controlling the action of said condition changing means to raise the space temperature when the space temperature becomes too low, changeover means for selectively arranging said condition changing means for heating or cooling said space, means including a space temperature influenced thermostat for controlling said changeover means in a manner to actuate said changeover means for cooling the space when the space temperature rises above a predetermined value, and means responsive to outdoor temperature cooperating with said cooling control means to raise the space temperature value to which it responds upon increase in outdoor temperature when the outdoor temperature is high and cooperating with said heating control means to raise the space temperature value to which it responds upon fall in outdoor temperature when the outdoor temperature is low.

LEO B. MILLER.
HENRY F. DEVER.

CERTIFICATE OF CORRECTION.

Patent No. 2,309,411.                                    January 26, 1943.

LEO B. MILLER, ET AL.

It is hereby certified that error appears in the printed specification of the above numbered patent requiring correction as follows: Page 1, second column, line 17, for "hame" read --same--; page 5, second column, line 46, for "winging" read --winding--; page 15, first column, line 39, for "811" read --311--; page 19, second column, line 54, claim 22, after the word "the" insert --control of said--; line 55, same claim, strike out "of said control"; line 61, same claim, after "the" insert --control of said--; line 62, same claim, strike. out "of said control"; and that the said Letters Patent should be read with this correction therein that the same may conform to the record of the case in the Patent Office.

Signed and sealed this 20th day of April, A. D. 1943.

Henry Van Arsdale, (Seal).                           Acting Commissioner of Patents.